US009448002B2

(12) United States Patent
Asperas

(10) Patent No.: US 9,448,002 B2
(45) Date of Patent: Sep. 20, 2016

(54) SNOW MAN MAKING DEVICE FOR MAKING A SNOW PERSON HAVING LIGHT EMITTING STRUCTURES

(71) Applicant: Ignacio Marc Asperas, Melville, NY (US)

(72) Inventor: Ignacio Marc Asperas, Melville, NY (US)

(*) Notice: Subject to any disclaimer, the term of this patent is extended or adjusted under 35 U.S.C. 154(b) by 525 days.

(21) Appl. No.: 13/665,846

(22) Filed: Oct. 31, 2012

(65) Prior Publication Data

US 2013/0119231 A1 May 16, 2013

Related U.S. Application Data

(60) Provisional application No. 61/553,750, filed on Oct. 31, 2012, provisional application No. 61/576,336, filed on Dec. 15, 2011, provisional application No. 61/580,244, filed on Dec. 25, 2011.

(51) Int. Cl.
| | |
|---|---|
| *B29D 22/00* | (2006.01) |
| *F25D 11/00* | (2006.01) |
| *B29D 22/04* | (2006.01) |
| *A63H 3/00* | (2006.01) |
| *A63H 9/00* | (2006.01) |

(52) U.S. Cl.
CPC ............. *F25D 11/003* (2013.01); *A63H 3/006* (2013.01); *A63H 9/00* (2013.01); *B29D 22/00* (2013.01); *B29D 22/04* (2013.01)

(58) Field of Classification Search
CPC ........ A63H 9/00; A63H 3/006; B29D 22/02; B29D 22/04; B29D 22/00
USPC ....... 249/65, 102–104, 114.1–116, 127, 137, 249/139, 154, 164, 173; 62/344–346, 351, 62/264; 362/234, 253, 311.02, 311.1, 362/311.15, 361, 372, 450; 446/73, 79, 97, 446/91
See application file for complete search history.

(56) References Cited

U.S. PATENT DOCUMENTS

| | | | | |
|---|---|---|---|---|
| 3,304,651 A * | 2/1967 | Deyerl | ......................... | 446/439 |
| 4,717,158 A * | 1/1988 | Pennisi | ........................ | 473/570 |
| 5,814,380 A * | 9/1998 | Tamborello et al. | ............. | 428/9 |
| 6,284,330 B1 * | 9/2001 | Hermanson | ........................ | 428/9 |
| 7,178,342 B1 * | 2/2007 | Knapp | ................ | 62/1 |
| 7,264,531 B2 * | 9/2007 | Asperas | ........................ | 446/71 |
| 7,914,166 B2 * | 3/2011 | MacAlister | ................... | 362/101 |

(Continued)

FOREIGN PATENT DOCUMENTS

JP EP 1726336 A1 * 11/2006 ............. A63B 43/06

OTHER PUBLICATIONS

Luck et al., "An Investigation of Musicians' Synchronization with Traditional Conducting Beat Patterns"; vol. 1(1): 26-46; ISSN 1755-9219; Published on 2007.*

*Primary Examiner* — James Sanders

(57) ABSTRACT

A ball is provided forming an inside structure of the snow person, the ball having an inner and outer surface. The ball is a unitary work piece that is free and unconnected to other work pieces. An adhesion surface is disposed on the outer surface of the ball, the adhesion surface provided with nodules that extend away from the surface of the ball to adhere snow while the ball is rolled. Light units are integrated into the surface of the ball and having light emitting portions that extend away from the surface of the ball. A light output of the light units is selected to transmit light through a layer of snow. Connections between the light units situated within the ball connect the light units together.

26 Claims, 28 Drawing Sheets

(56) References Cited

U.S. PATENT DOCUMENTS

| | | | |
|---|---|---|---|
| 7,963,500 B1* | 6/2011 | Holiday | 249/168 |
| 8,011,991 B2* | 9/2011 | Asperas | 446/71 |
| 8,753,161 B1* | 6/2014 | Van Denburgh, III | 446/73 |
| 2006/0057932 A1* | 3/2006 | Gick | 446/269 |
| 2006/0172653 A1* | 8/2006 | Asperas | 446/97 |
| 2006/0172654 A1* | 8/2006 | Asperas | 446/97 |
| 2008/0094839 A1* | 4/2008 | Pan | 362/285 |
| 2008/0227362 A1* | 9/2008 | Asperas | 446/97 |
| 2011/0007510 A1* | 1/2011 | Plumb et al. | 362/249.19 |
| 2011/0277310 A1* | 11/2011 | Washburn | 29/527.1 |
| 2012/0062151 A1* | 3/2012 | Lin | H05B 37/02 315/312 |
| 2013/0307180 A1* | 11/2013 | Klaves | 264/219 |

\* cited by examiner

Figure 3c
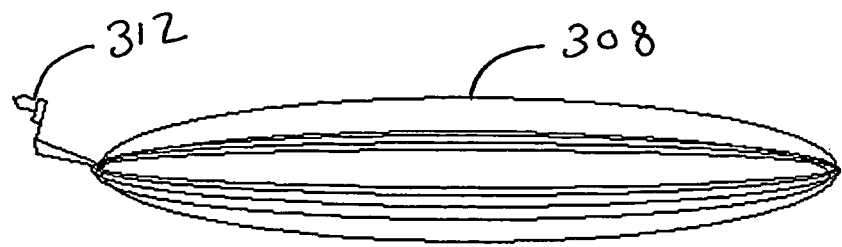
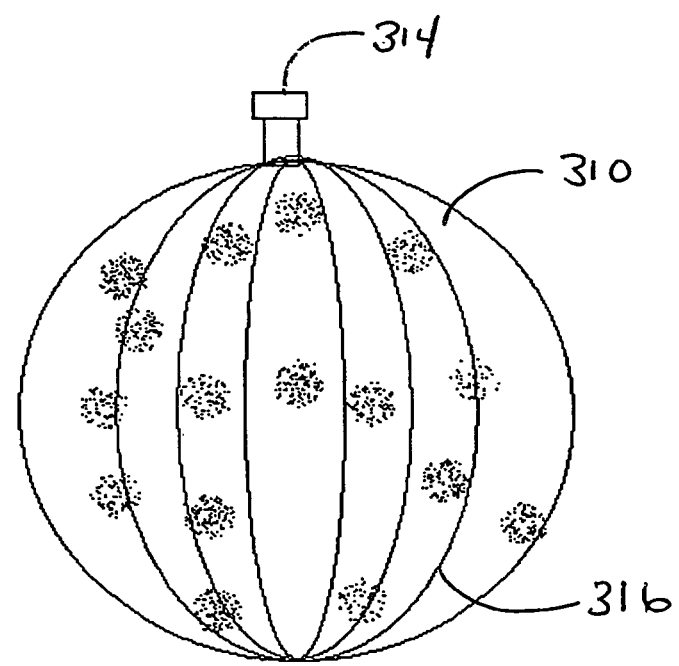
Figure 3d

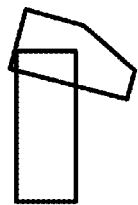 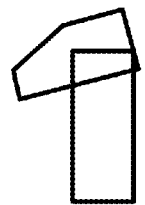 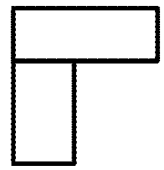 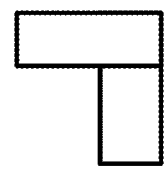
Fig. 13a
Fig. 13c
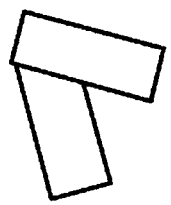 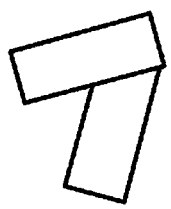 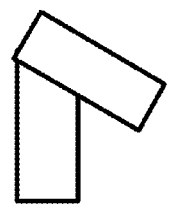
Fig. 13b
Fig. 13d
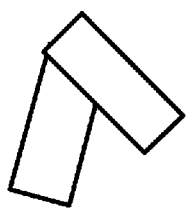 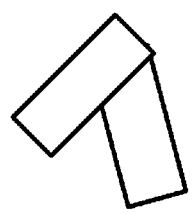 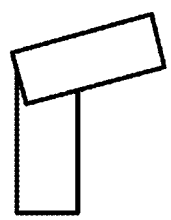 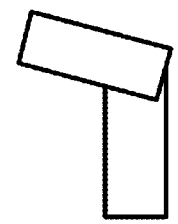
Fig. 13e
Fig. 13f

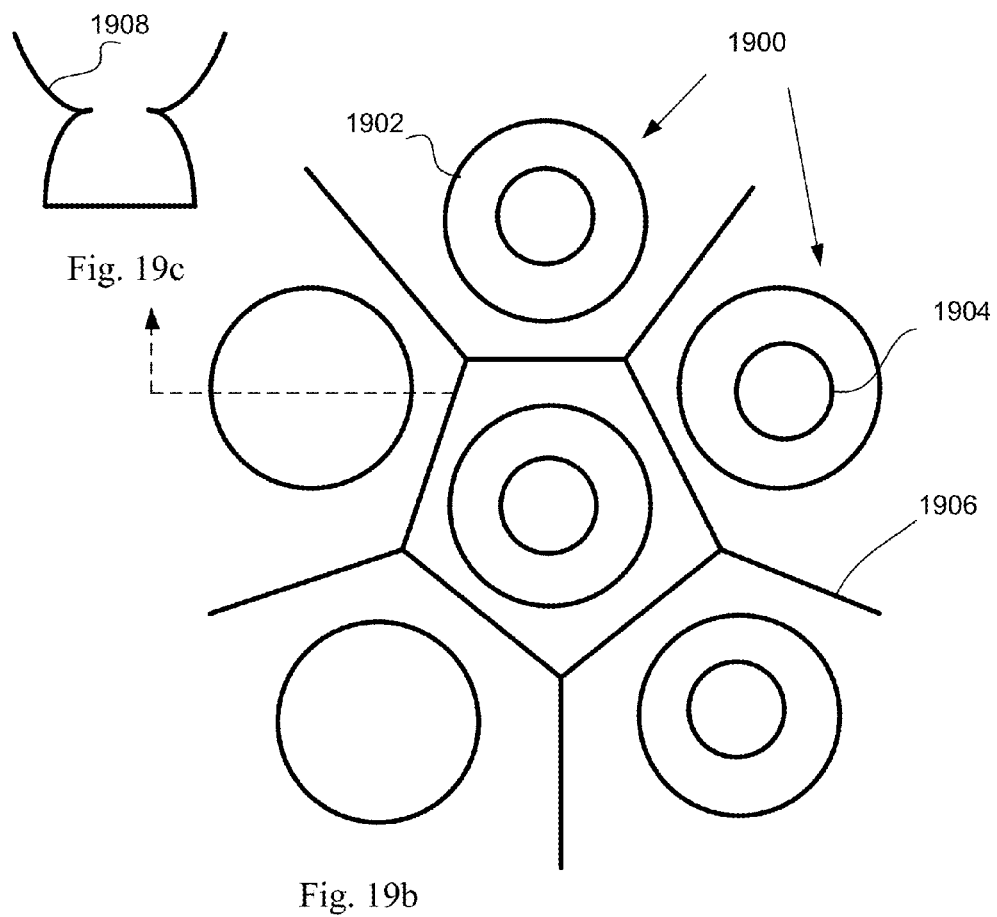
Fig. 19c
Fig. 19b
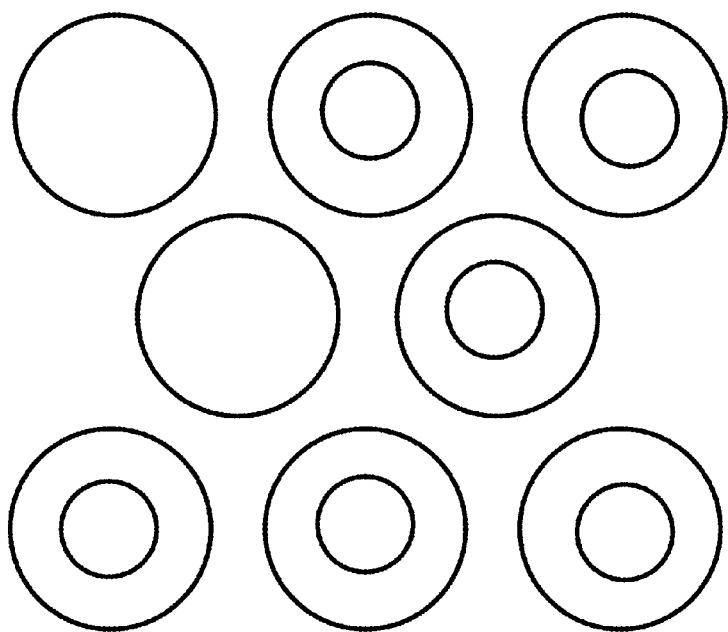
Fig. 19a

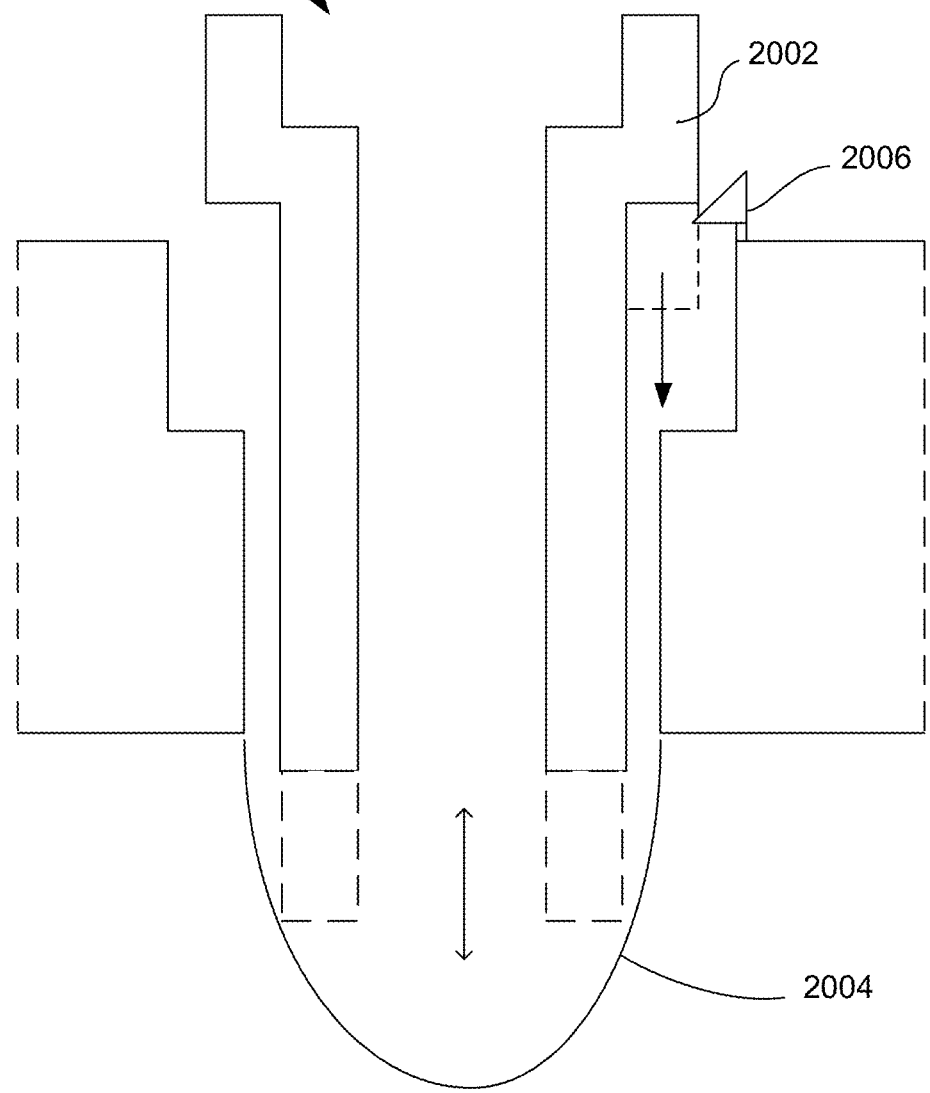

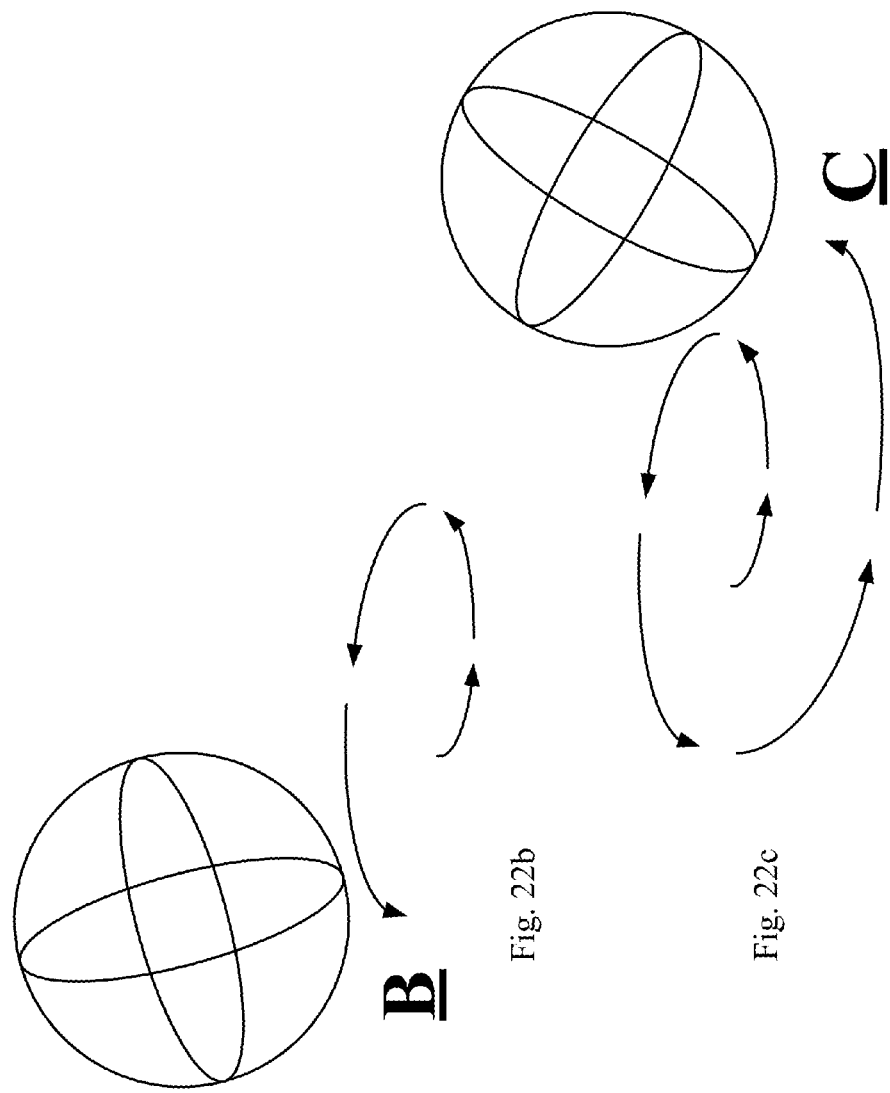
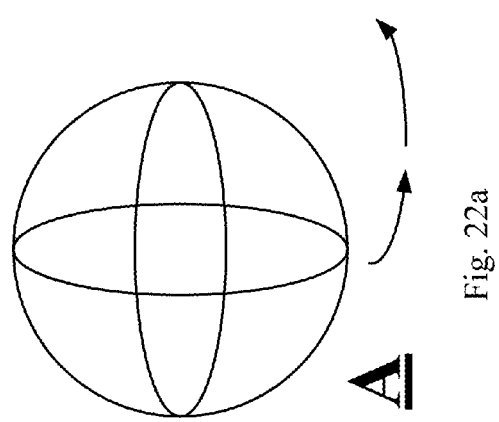
Fig. 22a
Fig. 22b
Fig. 22c

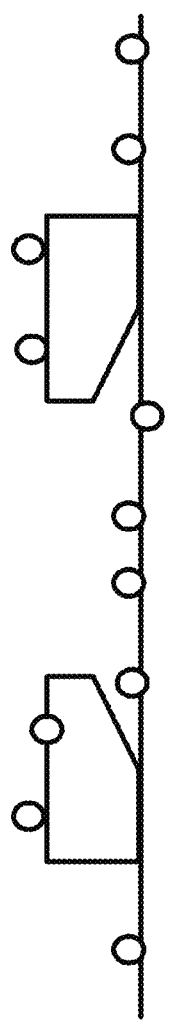
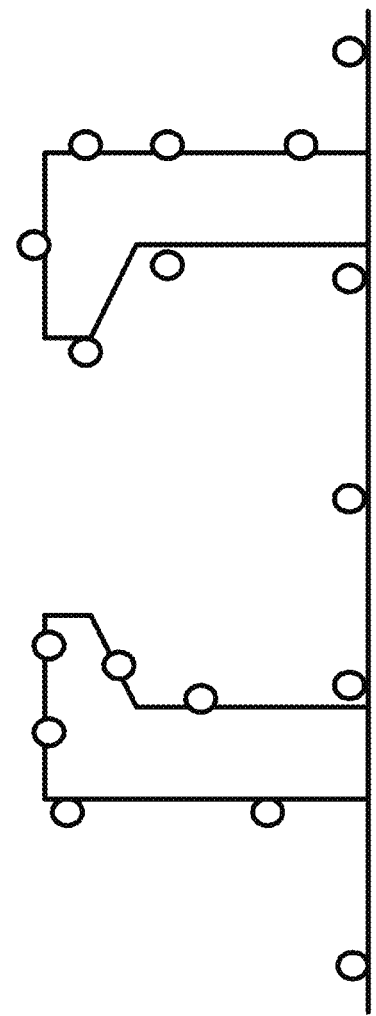

SNOW MAN MAKING DEVICE FOR MAKING A SNOW PERSON HAVING LIGHT EMITTING STRUCTURES

PRIORITY

This application claims the benefit of priority to Provisional Application 61/553,750 filed Oct. 31, 2011, Provisional Application 61/576,336 filed Dec. 15, 2011, and Provisional Application 61/580,244 filed Dec. 25, 2011, all of which are incorporated herewith.

BACKGROUND

History of the Snowman/Woman

The history of the snow man or snow woman is unknown. But, I have to say this. Whoever the first person was to think to form snow into a human figure was a genius. For untold years thereafter, children and adults alike have been thrilled and received joy in making and watching others make snowmen, err women. You know what I mean.

At any rate, what is remarkable is that no one has ever thought of, or at least reduced to practice, a way to make snow people easy and fun. I have done an abbreviated patent search and there is nothing relating to the subject of creating a snowman. Unbelievable since it is so much fun and considering the effort involved. But, if no one has thought of it, well, no one has thought of it.

Making a snow man is hard work. As an old pro, I know what a pain in the back it is to roll a snow boulder around a yard. As the snow boulder grows, it gets exponentially difficult. So if you want to make a real big snow man, like me, you wind up breaking your back.

If you're like me, you enjoy building snow men . . . big. The bigger the better. One problem is there isn't always someone around to help. It is very difficult by yourself. Over the years, I have developed different tricks to assist my self-style of building snow people. My favorite trick is to use the long end of a shovel as a lever to rotate the boulder when it is really big. With this trick, you can keep rolling the boulder a precious few feet and get the boulder really big.

Another trick I have considered is to start rolling the snow ball on top of a hill or on a slope and work downward as the boulder gets bigger. Even though this works relatively well, it's still hard work to get the boulder to be really big. Besides this, you may wind up with an uncontrollable rolling snow avalanche.

But building a bigger boulder belies an even greater mischief. That is, getting the torso on top. Of course, you would want the torso to be proportional to the oversized boulder you have already created, so the torso has to be fairly large as well. Now, the boulder is pretty heavy. Compacted snow is virtually like ice! And you have to lift the darn thing a good four feet. Now this is really back breaking.

Not to mention that now you have to put the head on top. All of this is pretty difficult even for an adult (or big kid) like myself. What is more, I really cannot build a bigger snow man than about my height. The boulder is just too heavy. Just consider how a kid, who would love to build a big snow man/woman, would have no chance without adult help.

I have tinkered with the concept of building a ramp in order to roll the torso boulder on top of the base boulder. I have tried to make a wooden ramp, but the wood proved to be too flimsy to hold the heavy weight. I then considered building the ramp out of snow. But the boulder is just too darn heavy and squashes the snow down. And building such a ramp requires a lot of time, and snow, which you don't always have.

You never realized there were so many hurdles in building a snow man did you? Well, here is another. Getting the snow man/woman in the precise perfect place. Let's say you want the snow man right in front of the house door. Well, gravity has a lot to say about that. If your house, like most houses are built up to provide drainage, it becomes a serious physical effort, as well as logistical challenge, to roll the boulder to the right spot.

Another thing has always bothered me when I have built snow people. You can never make a perfect snow man. The snow balls are never, and I mean never, perfectly round. They are always lop-sided and look sort of goofy.

There is a construction problem, as well, related to the non-uniformity of the snow balls. Namely, it is difficult, particularly with large snow men, to balance another snow ball or boulder on top without it toppling over. To make matters worse, the third ball or boulder on top is made even more difficult to balance on a bust that is already tipsy.

Another problem in the art is that there is often not enough snow. With the first snow fall of the winter, ushers into each of us elatement and joy of running outside and playing in the snow. Unfortunately, all of this enthusiasm is lost on a lack of snow. The first snow fall usually never sticks. We can also drag in global warming here as a culprit for seemingly declining snow levels. But this patent attorney won't reach that far. The point is, wouldn't it be great if we could build a snow man of decent size with relatively less or little snow fall.

Last but not least, one must consider that the snow person is subjected to warmer temperatures and will melt. It will settle as the weight of its own snow compacts in on itself and deform, possible falling over. Adornments placed on the snow man will tend to loosen and fall out. Happy smiles fade into frowns. Eyes get droopy. Wind will blow away hats, scarves and other accoutrements. Finally, there is terminality. You have to do all of that back breaking work again if a warm snap comes and melts your snow man.

Of course, all of the problems of making snow men/women is part of what makes it fun. Getting a whole group of people around and working together; being outside in the snow for hours; and, yes, having a doofy lop-sided snow man does have some charm. And even if you don't have enough snow, who cares anyway.

That may be true. But we are living in the 21st century now. We have created the Internet. China is getting ready to send a person to the moon. And we invented silly putty, perhaps one of the all-time greatest inventions a big kid ever invented. Can't somebody build a better snow man?

So then the flash of genius strikes me. What if? What if someone could make a snow boulder that was light weight. So light, it could be easily handled so that it could be made really big and still be easily moved, or even carried, even by a youngster. A snow boulder light enough to be easily placed on top of another boulder. Or light enough even to be easily positioned in that perfect place in your yard?

What if someone could make a snow boulder that was perfectly symmetrical, so that it could easily balance on top of another similar boulder. A symmetrical boulder that could form a perfect looking snow man? How cool would that look in front of your house during the holidays?

What if someone could make a snow boulder that is perfect every time. A snow man that could be replicated so that it looks the same each time, each year. Or rebuilt from the old snow man/woman in a matter of moments.

What if someone could make that out of a light weight, abundant material that is cheap and is practically used in all toys?

What if a really big snow man could be built utilizing the bare minimum of snow? What if?

Today is that day.

SUMMARY AND OBJECTS OF THE INVENTION

It is said that the most ingenious ideas are the most simple in design. The Wheel. The Toaster oven. And, yes, now the ultimate Snow Man. Of course, in hindsight the wheel is not so inventive, but at the time it was an earth-shattering innovation. I do not pretend that the ultimate Snow Man will be as revolutionary to the advancement of mankind, but I do contend that as far as I know no one has ever conceived and reduced to practice such an apparatus. I do contend, however, that my innovation is a heck of a lot more fun, than a plain old wheel, and will inspire tons of enjoyment and play for hopefully a long time.

The fundamental building "block", or component, of the invention is the creation, for the first time, of a snow sphere that is much lighter in weight than a snow ball or boulder of the same size made out of snow. The snow sphere is made of a material that is rigid enough to support a layer of snow, yet made of a material or construction that causes the snow sphere to be much lighter in weight than a snow boulder of similar size. The Snow Sphere preferably includes a snow adherent surface that is amenable to bearing and holding snow particularly for varying conditions of snow from dry to wet.

In one aspect, the interior of the snow sphere, thus encased in a layer or sheath of snow, is hollow or substantially hollow. For this reason, it is much lighter and, thus, much easier to handle than a snow boulder of the same size comprised entirely of snow.

Further, given the spherical shape of the Snow Sphere, the snow formed on the adhesive surface forms a shell that reinforces and, indeed, provides its own support and rigidity. In another aspect, or in combination therewith, the Snow Sphere includes supporting structure on the inside, such as spokes, ribs or STYROFOAM.

The invention further encompasses the construction or assembly of such spheres, a number of such snow spheres as well as the assembly of such spheres. There is also provided a manner to adjoin the boulders together. There are also attachments and means for attachment for the invention for body members or decorative objects.

From the above, it shall be appreciated that the present invention provides an elegant solution to the age old problem of snow man/woman building technology. Using the present invention, one can much more easily manipulate one or more of the Snow Spheres in order to roll, position and assemble a snow man/woman. Certainly, this provides an enormous advantage over the prior method of hefting large, snow compacted, boulders atop another. Kids all over the world will be able to easily and quickly build snow men/ women adding immensely to the enjoyment and fun of the art.

Because the invention forms near perfect spheres, there is also the advantage that beautiful well dimensioned and proportional snow people can be built. Usually, only lopsided and imperfect snow people could be achieved in the past. Snow men/women perfectly formed may also be appealing for business displays or holiday decoration in front of official buildings. However, we shall leave the business method aspect of this invention for the next patent application.

BRIEF DESCRIPTION OF THE DRAWINGS

FIGS. 3c-d illustrate a variant of the invention;

FIGS. 13a-13f show different orientations of the nodule heads;

FIGS. 19a-c show a configuration of the nodules from above;

FIG. 20 shows a plunger type nodule embodiment;

FIGS. 22a-c show a technique for rolling the snow sphere;

FIGS. 24a-b show nodules integrated with a grit material.

DETAILED DESCRIPTION OF THE PREFERRED EMBODIMENTS

Figure 1:
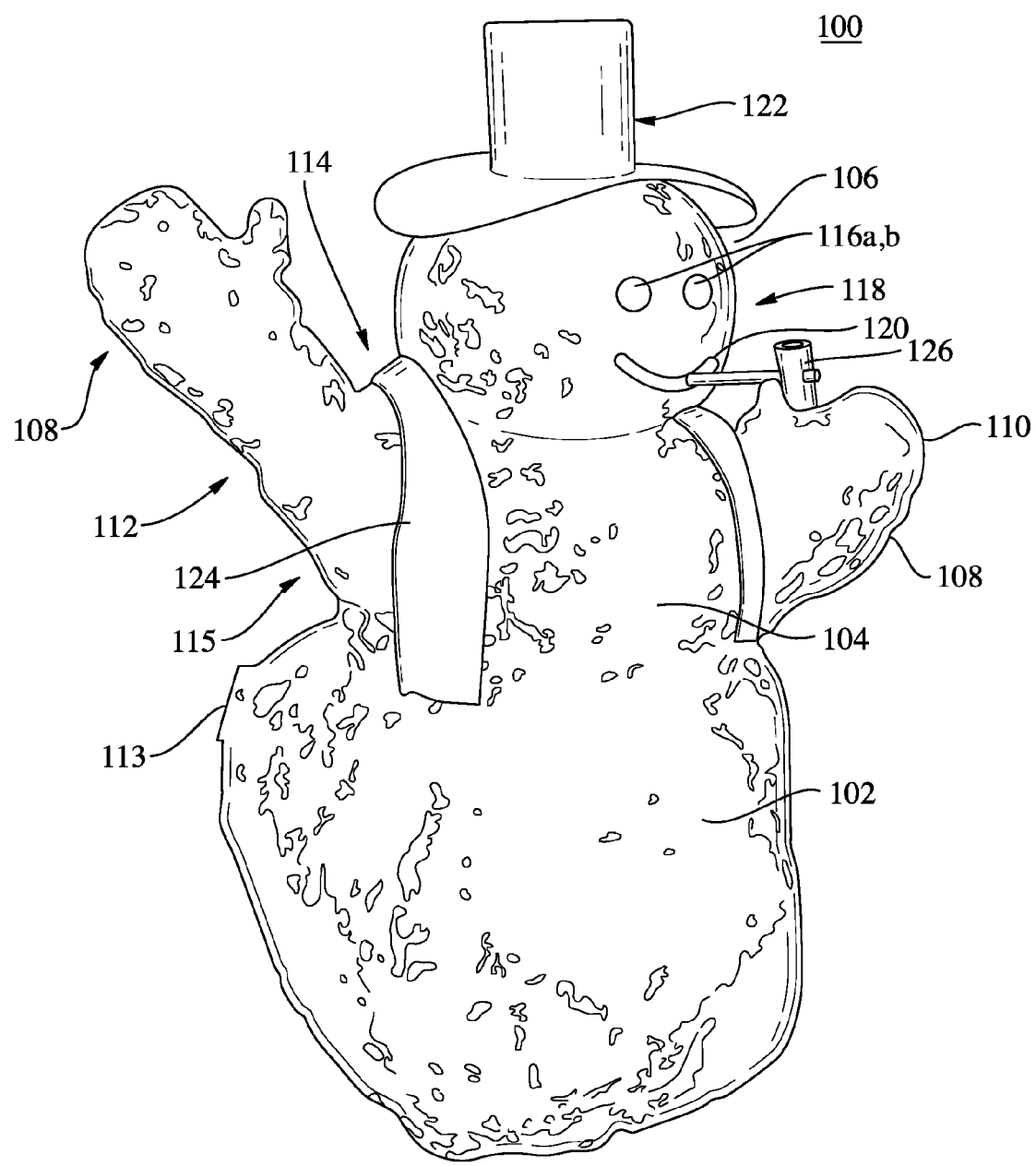
FIG. 1 illustrates a snow man.

To gain a better appreciation of the task at hand, we turn our attention to FIG. 1 which illustrates the good old fashioned snow man 100. But I shouldn't say its good old fashioned, because I used some proprietary techniques to build it. Before we go there, however, let's examine this snow man in more detail.

I made this snow man all by myself. It stands about 6 feet high without the hat and comprises three snow boulders 102, 104 and 106 which we shall call the trunk, or base, 102 the torso 104 and the head 106. There are also arms 108, a feature I am somewhat proud of. Notice the realistic mitten shape 110 of the gloves. Although it is arguable that kids across the globe make arms out of twigs, icicles or even branches encased in snow, I think one can say that I have advanced the art here. I received a lot of compliments on my snow man. For all that, there are problems.

First of all, you will notice that our snow man, which I shall refer to as Frosty, has quite a large caboose 113 on his trunk 102. In less politically correct terms, his behind is quite large. This is the result of not being able to roll the snow ball evenly. In fact, to obtain such a spherical shape is quite impossible. As the snow boulder grows in size, it tends to form unevenly. I believe this is due, in part, to the varying density of the snow on the ground.

The same can be seen with smaller boulders, such as the torso 104. Here, Frosty apparently seems to be suffering from Hunchback of Notre Dame Syndrome 114. What hump? I suppose these irregularities could be eliminated if one were so careful to roll the ball perfectly in every direction. However, that would require perfect and uniform snow conditions. At any rate, it would take ages to adjust the boulder as it rolls to the perfect side so that the ball is nice and spherical. This is not fun.

I know what you are thinking. Why not just lop off the uneven portions. I tried this. It's not so easy on compacted snow. Also, it changes the balance of the snow man. If you lop off a large section, you seriously jeopardize the balance of the snow man. In doing so, you could knock your snow man right over. Particularly as the snow melts, the snow man will slump to one side, again possibly falling over.

On the positive side, the arms in FIG. 1 illustrate just how creative one can get with a snow man like Frosty (or snow woman, which we will later refer to as Angel). I am quite proud of these arms. My secret is to pre-place holes in the side of the torso 104 using a branch or, in the instant case, a long board. Then, I remove the board and compact snow around the board to form a snow arm. I then mold snow hands in the shape of mittens. I leave a little extra of the board sticking out that will be placed in the prepared slot.

I then build up snow shoulders, not only for aesthetic appeal and anatomical correctness, but also for support of the arm. One must consider longevity. Frosty will melt and the arms will sag if left unsupported. I also try to support the weight of the snow arms by shoving the board as far down into the trunk 102 as far as possible. Thereby gaining leverage and support from the trunk 102 and lowering the center of gravity of the arms.

As great as these arms are, however, there are several problems with my previous constructions. First, you will notice that the shoulders can never be in the anatomically correct position. Instead, they are formed at a middle point 112 of the torso 104. This is apparently due to the fact that the torso 104 cannot support the heavy weight of such snow arms at a relatively higher load, say at point 115. It looks stupid.

There is another fault here that needs to be pointed out. Normally, the arms must be placed on either side of the snow person at relatively opposite positions. This is due to the fact that the uneven placement of the snow arms at different corresponding positions causes the torso to tilt, particularly as the snow man melts and loses cohesion.

Another problem is apparent from this figure. Frosty appears to have measles. A really bad case. These are actually crab apples that stuck to the snow boulders as they are rolled. Apparently, the larger the boulder, the more its weight presses down and compacts the snow as it rolls. With extremely heavy boulders like this one, and given light snow conditions, the weight compacts the snow enough to pick up bits of earth, grass, and yes crab apples.

A final word here is due on Frosty's features. He has two eyes 116 a, b (not coal) and a mouth 118 made out of some stones. One particular problem, on such a warm day as it was, was that the stones kept falling out. Cold stones seem to have terrible adhesion with snow. You can see here that Frosty is missing his two front teeth 120. Further, Frosty sports some additional props, a top hat 122, a scarf 124 and a pipe 126. As any kid can tell you, the problem is that a good wind will blow that hat 122 right off. The scarf 124 is more resistant to being blown off by the wind, but it definitely did flop over to one side and had to be re-positioned later. The pipe 126 seems to be quite secure as it has a long distal end that is shoved into Frosty's mouth. We want to ensure Frosty's lip cancer. But, in actuality the pipe 126 kept falling out as the snow melted. Frosty new better.

Needless to say, despite the fact that it is January it has warmed up since then and Frosty is now "awl melty" and "gawwn". Gee whiz. Even though this snow man only took me 2 hours (I worked really quickly), it was tiring and exhausting work even for an expert like myself. Now I have to start all over again.

Enter the ultimate Snow Man. The present invention provides a unique manner in which to build or construct a snow man or woman and a method therefor.

More particularly, there is provided the building blocks and method to provide and assemble the building blocks for creating the ideal snow man/woman. What is invented is the ability to create snow boulders that are light weight and, therefore, more easily handled and lifted atop other such boulders. With this invention, the ideal snow man/woman can be created anywhere, with much less effort than before and without long hours in the cold.

In this invention, a snow man or woman may be as little as two snow balls or boulders. Of course the traditional number of snow boulders for a snow person is three, and naturally the invention encompasses three boulders. That said, the invention encompasses more than three snow boulders. At any rate, we shall focus here on the fundamental building block of the invention, a single snow sphere. Such a snow sphere could be utilized, for example, as a torso or head on top of a normal snow boulder.

Figure 2A:
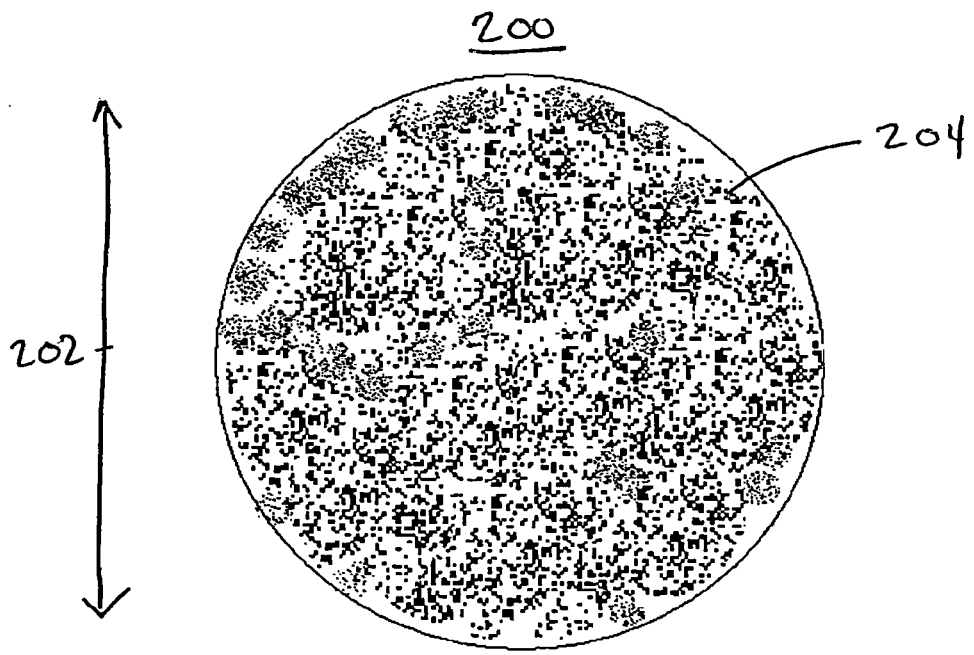
FIG. 2a illustrates the present invention.

FIG. 2a shows the fundamental building block of the invention: the Snow Sphere 200. The Snow Sphere 200 is a sphere or sphere like shape generally in shape of a sphere. Naturally, the snow sphere is sphere shaped so that it may be rolled easily in any direction, thereby attaining the ideal spherical snow boulder. The spherical shape also provides the builder with ease of maneuverability and handling of the snow boulder.

The dimensions of the Snow Sphere shall not be limiting of the invention. That is, the Snow Sphere may be of any size. However, in one aspect of the invention, the snow sphere or spheres are proportional to the size of the size of a normal man, woman or child which they emulate. In other words, a diameter 202 for trunk snow sphere in this aspect for an adult snow person would be the height of a normal adult up to the area of the hips. A child trunk would be proportionally smaller, naturally. Similarly, the torso diameter for an adult is about the same length of a torso of a normal adult. Of course, the range of sizes varies with the variety and range of human sizes.

The head is another matter. While the head may be of any size, it is typically in proportion with the trunk and torso. (See for example FIG. 1.) In this variant, therefore, the diameter of the snow sphere forming the head is proportional to the other snow sphere or spheres. Again, the head, torso and trunk may be of any size. For example, it is an advantage of the invention to create larger than life snow men/women and, therefore, the proportions of the invention may be larger than normal. FIG. 2a also illustrates another variant of the invention: the adhesive surface 204. The function of the adhesive surface is to provide a grippable region where snow can more easily clump and form within the pockets between elements forming the adhesive surface. Test trials have been performed and have proven that it is much easier to apply the snow to the Snow Sphere 200 with the adhesive surface than to a sphere with smooth surface. In the latter case, the snow tends to slide off one side of the smooth sphere, particularly when rolled. In the alternative, the adhesive surface holds clumps of snow in place on the Snow Sphere whilst the builder scoops up more snow and applies another clump to another region. The adhesion surface is designed to include a substantially higher friction coefficient than a smooth surface that is sufficient to grip or hold snow thereon.

In operation, the snow sphere is rolled to attract snow on a side of the snow sphere that is in engagement with the snow and, by action of the user pressing substantially on the opposite side thereof, the pressure which is transferred to the engaging side causes the snow particles to be picked up by the adhering surface by action of the nodules/holes thereon, the pressure causing the snow to partially melt and stick to the nodules/holes or a combination of both.

In this aspect, it is quite convenient that the builder does not have to stoop down and apply the snow manually to the snow man. The builder continues to roll the snow sphere about its x-y-z axes, in each direction, and by substantially each degree of axes x, y and z until the snow sphere is covered in at least a layer of snow. If it is chosen to apply more layers, this first layer provides an outer surface of stickiness for all other layers. Thus, as already mentioned, the snow sphere for use in this embodiment should be of a suitable strength, that is the cross-sectional strength, to withstand pressure from a builder pressing down, and even perhaps leaning on the snow sphere, from above.

In testing prototypes, it was discovered that the sphere shape has a previously unrealized advantage. It appears that when a roller is used, which has a cylindrical shape, a second or third rolling of the roller causes snow to peel off the roller. It took some effort to cause the roller to be completely covered. The sphere, on the other hand, allows a rolling of the sphere to contact one general area of the snow sphere, thus avoiding multiple rollings and the peeling effect of the snow. Once the snow sphere is completely covered, the snow in adjacent areas support each other and do not come off, i.e., peel, from the snow sphere.

Once the Snow Sphere 200 is encased in a layer of snow, the builder simply rolls the sphere on the snow to build up more snow on the Snow Sphere. The snow on the Snow Sphere has proven to grip well with snow on the ground. Because the Snow Sphere is large to begin with, it is already quite sizeable with this first layer of snow manually applied by the user. With the added weight of the first layer of snow, the Snow Sphere has proven to be able to have enough weight to compact snow underneath it as it rolls and collect even more snow. Of course, the Snow Sphere itself is much lighter than it would have been if it were composed entirely of snow.

The adhesive surface has another function. As the snow melts, it tends to slide off an adhesion surface less readily than a smooth surface. This allows the Ultimate Snow Man to last longer and require less maintenance.

The snow sphere in one variant is white in order to hide any lapses in snow. This is particularly useful when the snow melts, leaving behind patches of the snow sphere surface exposed. In another variant the snow sphere is colored, such as red or orange, in order to highlight places to the builder which require more snow. A black surface has also been experimented with. It appears that the black surface warms quicker in the sun which tends to be better for gripping dry snow. Evidently, the warm surface of the snow sphere melts the first layers of snow it comes into contact with, providing crucial dampness needed for snow clumping.

Now we turn to the composition of the snow sphere. The snow sphere may be constructed out of any material that is suitable for holding its shape under the weight of the first layer of snow. On the other hand, the material need not be so rigid or thick as the snow itself will form the supporting structure once the snow sphere gets rolling. While this is not an exhaustive list, the snow sphere may be, for example, made out of plastic, graphite or any other composite, fiberglass, aluminum or any other metal. As long as the material is strong enough to support the snow sphere structure and the first snow layer, the material is acceptable.

Figure 2B:
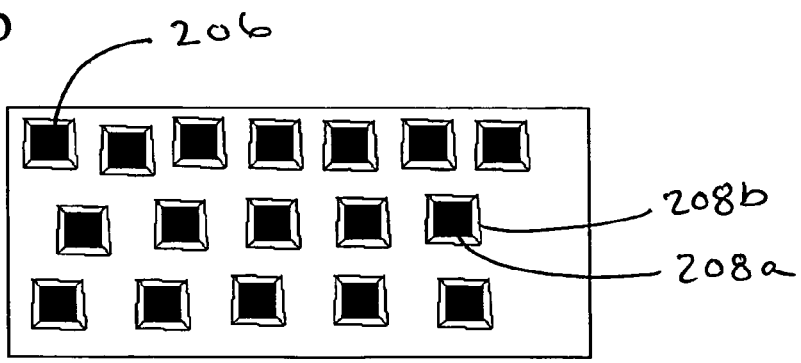
FIGS. 2b-c illustrate an adhesion surface of the present invention.
Figure 2C:
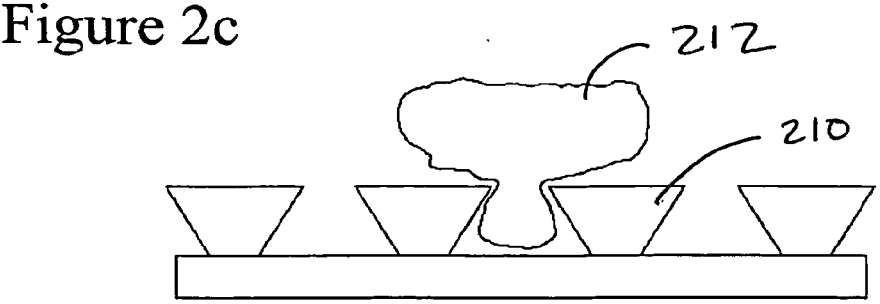

FIG. 2b illustrates a variant of the adhesive surface. Here the adhesive surface is comprised of nodules 206. Here the nodules are shown as trapezoidal shaped protrusions, or studs (square or otherwise), extending from the surface of the snow sphere. In one variant, the protrusions have a top surface 208a that is smaller than its base surface 208b. This is easier for molding the snow sphere. However, the invention also encompasses the surface area of the top of the nodules to be larger than the base (reference numeral 210), thereby trapping the snow 212 like pores in-between the open areas near the base of the nodules as shown in FIG. 2c.

There are a number of parameters of the nodules that effect adhesion. These are at least a shape of the nodule, size and spacing between the nodules which is important. In addition, the placement with respect to other nodules and texture of the nodule itself are other parameters that are important to adhesion.

These shapes have been experimented with by this inventor and the result of this experimentation will be set forth below. In another variant, the nodules may be in the shape of crosses or C or L-shaped. The nodules may be small balls, an advantage of which is that the snow is captured between and under the balls. A pattern forming a rough surface was also tested, such as a matrix formed of glue or silicon rubber.

Another variant experimented with is the nodule with a depression or snow receiving hole. Any of the shapes mentioned here may include such a depression. Although, squares and cylinders, in the shape or tubillinni pastas, as well as crosses with depressions was experimented with. It was found through my experimentation that the gripping effect of nodules with depressions improved the adhesion capability of the nodules. In particular, the snow is forced into the depressions (or holes) by the acting force of the snow sphere rolled or pushed down onto the snow. These depressions act to provide more grip to the snow and tend to "pick up" the snow well, allowing the snow sphere to be rolled and consequently be encased in a layer of snow.

Another variant on the mesh concept described above is the use of a screen or mesh that is elevated above the outer surface of the snow sphere by, for example, small posts between the mesh and the outer surface. The mesh may be rigidly fixed to the outer surface to form a small area between the outer surface and the mesh where snow enters the opening in the mesh and becomes trapped. The snow trapped in the mesh does two things. First, it forms a layer of snow that additionally assists in adhering snow to the outer surface of the snow sphere. Second, it provides a cold surface for the snow sphere.

It was assumed that pressure and heat causes the snow sphere to adhere snow better. To some extent this is true. But for some types of snow, particularly grainy snow, it was experimented and it was found that a lighter rolling of the snow sphere produced better results. A heavier roll caused the snow to compact into the ground and stay on the ground. While the texture of the snow sphere made an imprint that was appealing, it did not adhere to the snow sphere. On the other hand, in some instances, a lighter rolling of the ball yielded a higher adhesion of snow.

It was also assumed that a warm snow sphere would be better at attracting snow. However, in testing it seemed that, at least for dry snow a cold surface attracted the snow better. It is hypothesized that, much like the bottom of a ski that rubs against snow, a thin layer of water is formed on the surface of the snow sphere that causes the snow to slide off. In contrast, this implies that a material or surface that is cooled quickly or maintained cold would have better adhering properties. For example, any of the textures that attract snow, such as the mesh variant above, that cool the surface of the snow sphere would maintain a cool surface more capable of attracting snow particles.

An alternative to a mesh suspended above the surface is to cover the snow sphere with steel wool, the locks of the wool trapping snowflakes and particles within. Further rolling the snow sphere adheres more snow to the already caught snow in the wool.

Other textures are also suitable for use as the adhesion surface. These other textures may have varying degrees of grip to the snow dependent on the type of snow. For example, the larger nodules have proven not to be as effective for dry snow. A sand paper adhesion surface has been experimented with and it appears that the smaller nodules of the gritty sand paper are slightly better for relatively dry snow. Of course, the invention encompasses any of these shapes or nodule forms or combinations thereof.

Other shapes for the nodules are within the scope of the invention as well. For example, in order to prevent injury to children, the nodules may be in the form of bumps. Depressions, such as round or square-peg holes may also be applied. Golf ball dimples could also be used. In that case, the depression or the dimples provide the area where the snow is compressed and sticks to the surface of the Snow Sphere. The nodules may be, for example, replaced by holes bored through the shell of the snow sphere itself.

The nodules, studs or depression do not necessarily have to be uniformly spaced over the entire surface of the snow sphere. Although, this would tend to add to the uniformity of the snow layer stuck to the outer surface of the snow sphere. In addition, it would be easier for a plastic mold to be constructed with evenly spaced depressions for the nodules. It is sufficient that the nodules should cover substantially the entire snow sphere so that the entire snow sphere may be applied or roll-covered, that is, rolled and snow adhering thereto, in snow.

Experimentation with a prototype snow sphere has revealed that certain materials may be preferable over others. It has been found through experimentation of this inventor, for example, that a soft rubber or elastic material yields to a pressure exerted on the adhesion surface such that a unit of the adhesion surface, such as a stud or other protrusion, will be forced into the surface of the snow sphere upon pressure contact with snow on the ground.

The effect of ground pressure on an elastic surface is considered. Here along the surface is an adhesion unit, such as a square peg. The function of the adhesion unit is to form an adhesion surface so that when a child rolls the snow sphere on a snow covered surface, that the pressure applied by the child causes the adhesion surface to adhere the snow to the snow sphere. Here, however, when the snow sphere surface is comprised of an elastic material, the pressure caused by the snow against the adhesion unit causes the adhesion unit to recede or be pressed into the surface of the snow sphere. As a result, the deformation of the snow sphere surface reduces its ability to grip and "pick up" snow.

A rigid material, such as hard plastic, has been tested and it was determined that the rigid material resists an impinging force, namely the pressure exerted on the surface of the snow sphere when rolled on the ground against a snow surface. What is meant by rigid, is a material that withstands a shearing force without significantly deforming, such that the adhesion factor of the adhesion surface is not significantly reduced.

Of course, this is not to say that rubber is excluded from the invention. Perhaps a hard enough rubber material or compound is used, or perhaps when the rubber is sufficiently cold as when in the cold outdoors, the rubber is stiff enough to avoid being deformed. Also, and as described below, an internal structure, such as STYROFOAM injected into the interior of the snow sphere may reinforce an elastic surface in order that it does not deform significantly under an impinging pressure. As discussed below, a balloon type of snow sphere with an artificial foam injected therein by the user is one possibility. Furthermore, a hard enough STYROFOAM ball is also suitable.

More research on the matter has revealed that various types of snow have different stickiness. Wet snow has a much higher potential of forming a snow ball than dry snow. The various forms of snow are discussed above in the background section. The solution here proposes to provide a toy for all types of snow, wet or dry, so that a snow person can be built with any (or significantly most) type(s) of snow.

As for spacing of the nodules with respect to another, it was found through experimentation that offsetting the nodules works well as it provides more of a gripping effect than when the nodules are spaced uniformly and side by side.

The size of the nodules was experimented with. As mentioned, sand paper was applied to a snow sphere, which work better for gritty snow. But it had poor gripping qualities when rolled. For all around purposes, that is both wet and semi-dry snow, I found using small stones with a width of about 2-5 mm, (glued) dispersed more or less continuously over the sphere, to work well for varying conditions. It would also seem that holes or nodules of this size would work well. I found the larger nodules not to be able to grasp dryer snow as well. I predict that these larger sizes would be fine for sticky snow.

The spacing between the nodules also seemed to play a role. Too wide spacing meant that the snow does not get caught in between the nodules. Too little spacing and there is not enough room to allow the snow to be caught. Similar to the size of the nodules, the spacing seemed to be of similar dimensions, i.e., 2-5 mm.

From the experiments, it seems that nodules that have a significantly smaller surface area at the impinging surface of the nodule as compared with the base, namely nipples or spike-like protrusions aren't working as well. This suggests that nodules with a side that is substantially vertical or reverse-inclined works well. However, the embodiment using small stones worked well also.

In assessing the material of the nodules, various materials were tried, including wood, cloth, plastic and rubber. Although all of these materials are within the invention, some materials proved better than others for snow with low stickiness factor. It was determined that the elastic nodules yielded too much and did not adhere snow as well. Cloth seemed to not stick to snow as well either. Wood for some reason was not a big winner either. Perhaps this has something to do with wood being a good temperature insulator and hence does not become cold enough to cause snow to stick to it.

On the other hand, hard materials such as plastic and metal performed the best. Plastic, or fiber glass, in particular might be overall the best since it seemed to get cold more quickly and is rigid. Plastic is also a static charge bearing material, as will be described, is a variant of the proposal to be combined with the adhering surface.

Forming the snow sphere of a rough, as opposed to a smooth, surface to increase adhesion was also tested. With wet and dry snow, it was clear before testing that a surface having a texture would lift the snow particles more easily. However, the dry snow also adhered to the smooth surface that was applied with a static charge. Therefore, the invention includes an adhesion surface, that is smooth, but adheres snow by action of the attraction of the snow from the static electricity.

An appropriate size of the snow sphere was also considered during experimentation and it was concluded that an appropriate size should take into account handling of the snow sphere by both an adult and child of suitable age, around 5 years old, combined with the ability to form suitably sized snow balls by use of the apparatus. That is, the snow sphere should not be too wieldy to handle but large enough so that a builder does not have to bend down too far. In ergonomic terms, the snow sphere can be rolled by placing weight of the builder on the sphere in a comfortable leaning position with the waist bent on the sphere and the arms spread on either side of the top of the sphere.

For a child, it would make sense to provide a snow sphere about the size of an NBA basketball or soccer ball. This may be considered a minimum size for range purposes but is not necessarily exclusive of smaller sizes.

On the other end of the spectrum, the correct size seems to be a sphere standing at about the knees to waist of an adult, about four feet in diameter. Again, this is not a fixed upper range, but one which would be preferred for handling and the ability to make suitably sized snow boulders.

A comfortable size for both child and adult would be approximately 2-3 feet in diameter. These sizes appear to provide a snow sphere that is easily handleable but also delivers a good size snow boulder. Too small a snow sphere and it would just be as easy to roll a ball manually. Also such a small sphere would not impart much of a weight advantage for applying leverage to the underside of the sphere to compress snow onto the snow sphere.

Figure 3A:
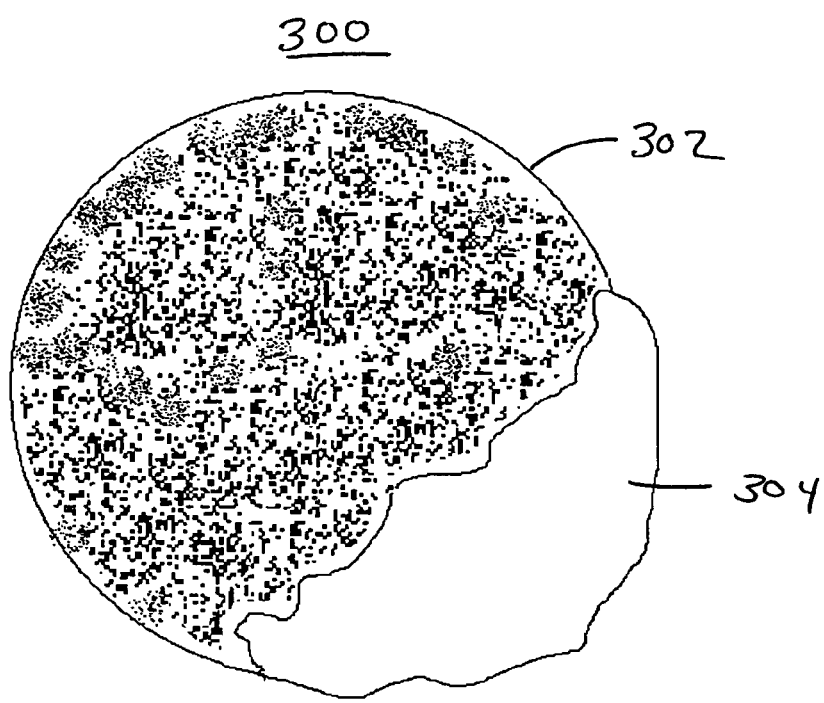
FIGS. 3a-b illustrate the invention in operation.

The clumping effect of the adhesion surface 302 of the snow sphere 300 is illustrated in FIG. 3a. There is shown snow 304 manually stuck to a portion of the snow sphere. As explained before, the adhesion surface holds the snow 304 in place, making it easier for the builder to add more clumps of snow. Of course, the adhesion surface keeps the snow adhered to the surface of the snow sphere while it is being rolled or in its stationary position.

Figure 3B:
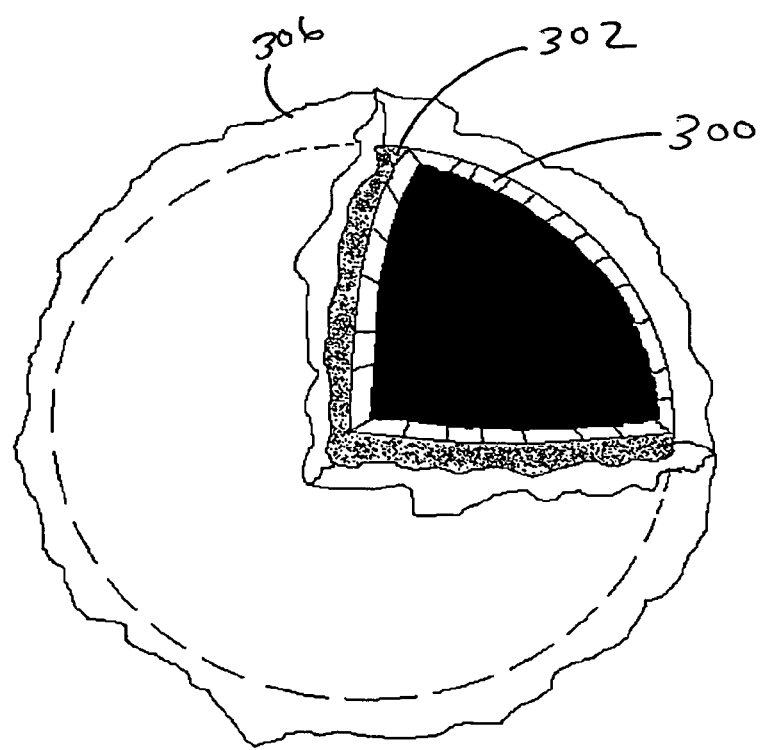

A phantom view of the snow sphere 300 that is completely covered in a first layer of snow or sheath 306 is shown in FIG. 3b. Except for the phantom portion removed for purposes of illustration, the snow sphere of the present invention is completely covered in snow. From this figure, it will be clear that massive savings of weight may be attained with the present invention. The snow is only on the outer surface and the entire inside of the snow sphere is hollow, substantially hollow, or made of a material that is of much less weight than compacted snow.

The result is a large snow boulder that is much lighter than a boulder of the same size. The resulting snow boulder of the present invention is, therefore, more easily manipulated and hefted than its primitive predecessor. It also has the advantage that it can be made even larger than normal, since it can be rolled much more easily than a boulder of the same size that is entirely made of snow.

FIG. 3b also illustrates a structural feature of the invention; the sphere or sphere-like shape is imparted to the snow covering the snow sphere. A physical characteristic of a sphere shape is that any point on the sphere is supported through adjacent points to all portions of the sphere. Thus, the snow itself obtains strength and supports itself once it is applied sufficiently to the surface of the snow sphere.

It should also be apparent from the figures that the show sphere is intended to be a unitary work piece. That is, it is not intended to be manufactured or sold as a composition of other pieces. That is, the snow sphere is, without first being rolled or covered in snow and placed on top of another snow sphere, free and unconnected from other work pieces. Of course, the snow sphere may be comprised of portions, such as hemispheres, but it is contemplated that the portions placed together form the unitary work piece. Later, a mechanism for adjoining the sphere to another sphere is contemplated, but this is added for the purpose of adjoining the snow spheres after they are rolled, or covered, in snow.

Another advantage of the use of snow hemispheres is that the snow sphere can be broken down into a storable and easily packaged product by placing one hemisphere inside the other. This is convenient for the user for storing during the summer or non-use. Another feature of the invention is that the snow sphere forms a storage container when not in use.

In one aspect of the solution, storage compartments are formed between the ribs of the snow sphere. The ribs may be formed in one hemisphere in order to accommodate storing items, clothes or toys, etc. The other hemisphere is formed empty in order that the first hemisphere may be placed therein. There is also provided a stand, such as a ring, such that when the hemispheres (one inside the other) are placed on the stand they form a storage container.

Another possibility, shown in FIGS. 3c and 3d, is that the snow sphere is a blow up sphere or beach ball with the adhering bearing surface. FIG. 3c shows the balloon 308, which is relatively deflated and the snow sphere balloon 310 inflated. The balloon may be blown up through a mouth piece 312 or inflating valve 314 opening that may be closed with a plug or valve cover as is well known in the art of blow-up toys.

A blow-up snow sphere has the advantage that the owner can store the snow sphere easily. It also makes stocking of the item and display in stores much easier. Also, the compressed air inside the balloon-snow-sphere adds to the support of the structure. The balloon is also much lighter in weight. The main concept is the same, i.e., the builder applies the snow clumps to the adhesive surface 316 and then rolls the snow sphere to create a large snow boulder that is lighter in weight than a normal snow boulder.

Figure 4A:
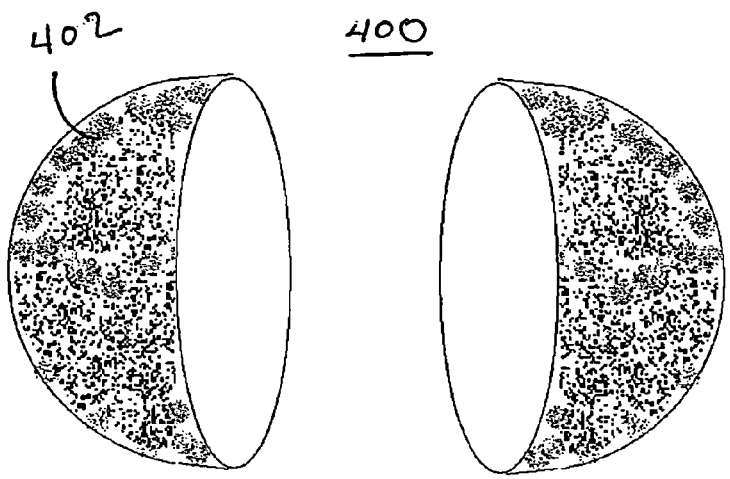
FIGS. 4a-c illustrate an interior of the invention.
Figure 4B:
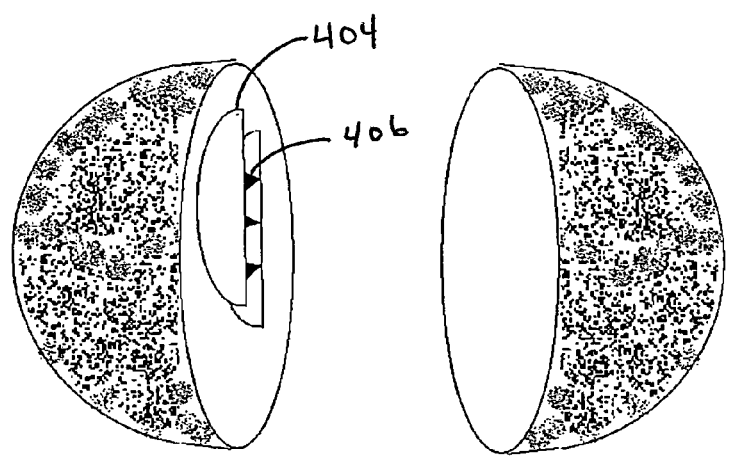
Figure 4C:
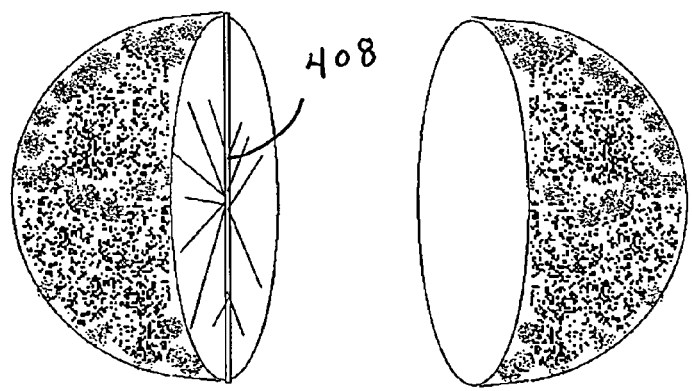

FIGS. 4a-4c illustrate the internal structure of the snow sphere 400. The adhesion surface 402 is also shown on the outer surface of the snow sphere 400. FIG. 4a illustrates that the interior of the snow sphere 400 may be hollow. It may also be made of a material that is light weight yet adds support and strength to the snow sphere, such as STYROFOAM, graphite, or other known lightweight materials. The lightweight materials may either fill the interior or be arranged to leave spaces, such as in a baffled, corrugated or matrix arrangement.

One technical aspect of building a snow man/woman that needs to be mentioned here is that it is helpful that the snow boulder be of sufficient weight in order to compress the snow beneath. This causes the snow to partially melt and bond with the adhesion surface or snow bearing on the adhesion surface in a process called snow sintering. In that case, it is helpful-if the interior of the snow sphere is filled with a light weight material that is substantially lighter than compacted snow, yet has sufficient weight to act as a ballast material to cause the snow boulder to compress the snow beneath sufficiently to cause snow sintering. However, this is merely a variant of the invention and the invention performs sufficiently well without such ballast particularly when the snow sphere is comprised of a material that is sufficiently hefty, such as plastic. Also, when the snow sphere is covered in snow, the snow itself acts as ballast and additional ballast may not be required.

FIG. 4b illustrates a variation of the invention, wherein the interior is formed by ribs or baffles 404 that contact or are fixed to an interior surface of the snow sphere. The ribs may include cross ribs 406 for added strength. The ribs add strength to the snow sphere, yet leave open spaces of air or light weight material in-between, in order that the overall weight of the snow sphere is significantly less than a snow boulder of similar size. The ribs may or may not be uniform and may be of the same material as the outer snow sphere shell.

FIG. 4c illustrates yet another variant of the interior of the snow sphere. Here, the interior is arranged with spokes 408. The spokes, similar to the ribs, provide added support and strength to the structure of the snow sphere. The spokes may be one or more elongated rods that span any arc inside the snow sphere and are fixedly connected to the interior surface of the snow sphere at distal ends of the rod. The spokes may also be connected at intermediary points along the rod, such as spokes on a bicycle wheel. The spoke may be uniformly spaced, or non-uniformly spaced. Of course, in the case of spokes, it is preferable that the spokes are uniformly spaced in order to ensure that the strength of the structure is uniform at generally every point on the outer surface of the snow sphere.

Figure 5A:
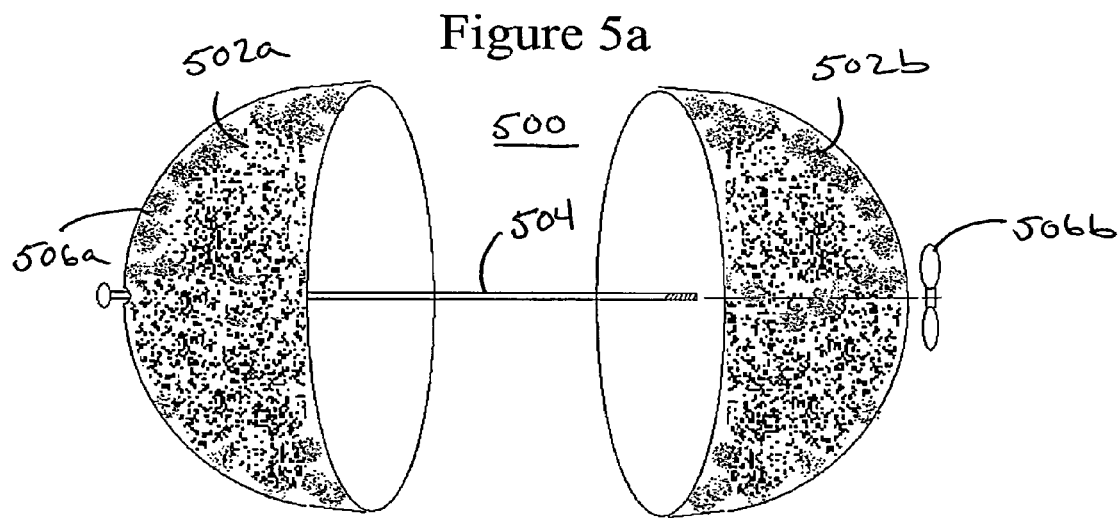
FIGS. 5a-b illustrate a connection mechanism of the invention.
Figure 5B:
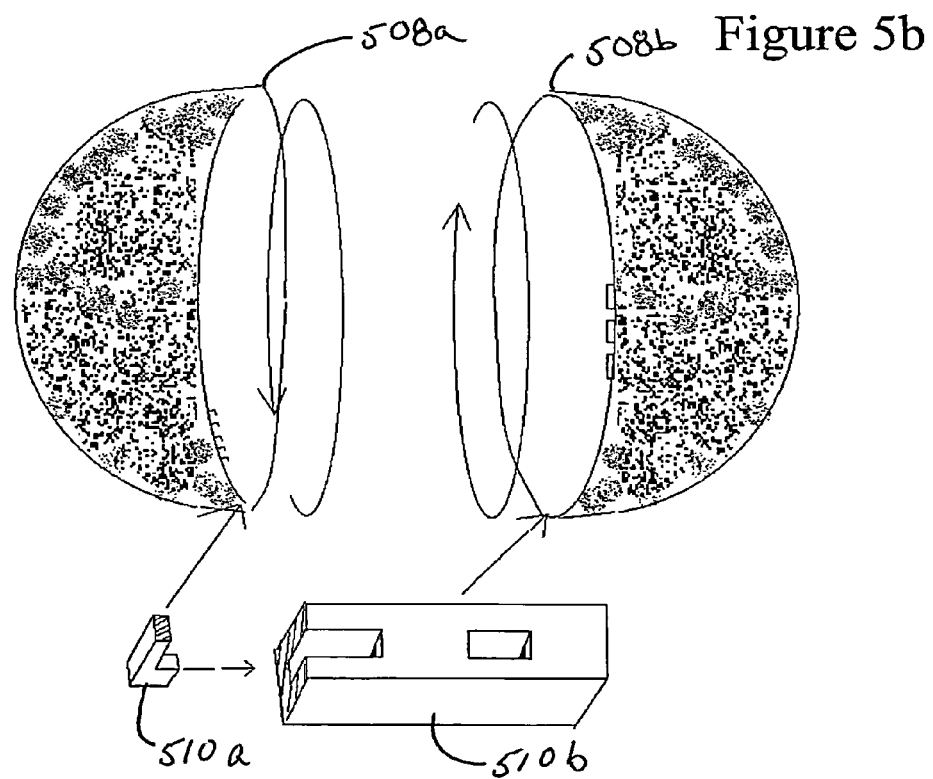

FIGS. 5a and 5b illustrate a variant of the snow sphere 500. For ease of production, storage and stocking, the snow sphere may be produced and sold in one or more portions. Here, there is shown that the snow sphere is provided in two half or hemi-spheres 502 a, b. In this case, it is also within the invention to create one hemi-sphere slightly smaller, so that it fits within the concavity or cavity of the other sphere. With this arrangement, the snow sphere hemispheres may be stored or stocked by placing one hemisphere inside the other, thereby greatly reducing space required for storage of the snow sphere. The hemispheres also make transport from the store easier.

At any rate, if the snow sphere is arranged in portions, there may be provided a manner in which to connect the hemispheres. In FIG. 5a, a connection scheme is shown in which there is provided a rod or rods that fasten each hemisphere to each other. In its simplest form, the rod 504 may be inserted through distal ends of the snow sphere and fixed at both ends in order to cinch the two halves together. In one embodiment, there may be a stopper at one end 506a to hold one hemisphere against the other and a nut, or wing nut 506b, threaded on threads formed on the other end. When the wing nut is tightened, providing that the rod is slightly large than an outer diameter of the snow sphere, the wing nut eventually bears on the outer surface of the snow sphere drawing the other end of the rod toward the wing nut end. When the stopper, which should be larger than a hole in the end of the hemisphere, bears against its side, the stopper causes the other hemisphere to bear against the opposing hemisphere. Thus, the two halves are brought together at their circumferences into close engagement and forming a single snow sphere. In one variant, the rod may be provided with one or more opposing threads at either end and mates with threads are positioned inside the interior of the snow sphere. In that case, the hemispheres are fixed together by screwing the threaded end or ends into the mates inside the opposing hemisphere.

FIG. 5b illustrates a variant in fixing the hemisphere together in that mating edges 508 a, b are provided on the lip of the bearing circumference of each hemisphere. In one aspect, the mating edges may be lock-type edges, shown here as L-shaped hooks 510a and mating sockets 510b. The hemispheres are brought together so that the mating surfaces are in close engagement and the L-shaped hooks bear into open regions in the opposed mating edge. The hemispheres are counter rotated with respect to each, thereby sliding the L-shaped hooks into the recesses of the opposed mating edge, thereby locking the hemispheres into place. Of course, any type of mating edge, including mating edges that snap together, may be used in the present invention.

The invention also encompasses a number of snow spheres arranged to facilitate the construction of a snow man/woman. Normally, the invention works well simply by stacking the snow spheres covered with snow atop one another. The lighter weight allows one or more people to heft the torso onto a snow sphere forming a trunk. The builder may also flatten or make a depression in the top of the trunk-snow-sphere in order to provide a platform for the torso snow sphere to rest.

Figure 6A:
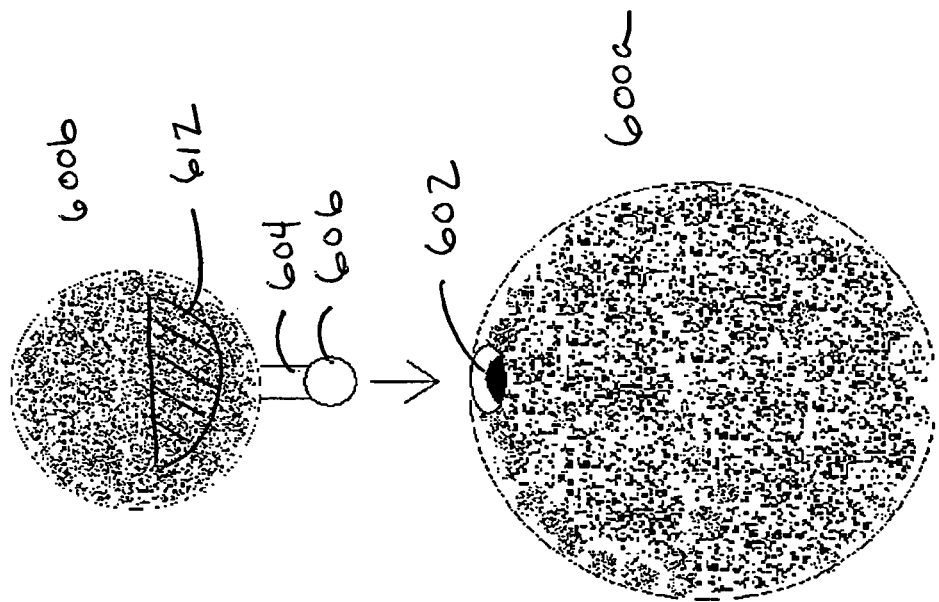
FIGS. 6a-b illustrate adjoining components of the invention.
Figure 6B:
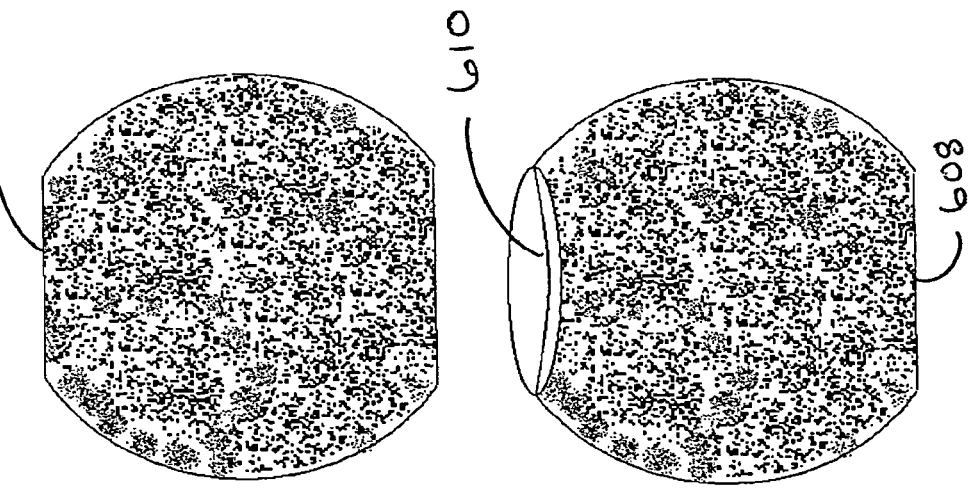

FIG. 6a illustrates a variant of the invention showing how the snow spheres 600a, b of the present invention may be adjoined. In this variant, a hole 602 is provided in one of the spheres that is dimensioned to receive a protruding portion 604 that is connected to sphere 600b. The protrusion 604 may include a locking ball 606 that is slightly larger than the diameter of the hole 602, such that when the protrusion is inserted into the hole the sphere 600b is locked into the sphere 600a. FIG. 6b illustrates another variant of the adjoining mechanism. Here, the sphere may include a flat surface 608 or a depression 610. The flat surface or depression facilitates balancing the snow boulders atop each other.

Another variant illustrated by FIG. 6a is that the snow sphere may include feature indentations. Here, there is shown a mouth cavity already placed in the snow sphere. When the snow sphere is formed with snow, the mouth cavity will form the shape of an open mouth, thereby facilitating later forming the mouth. Other feature indentations are within the scope of the invention.

Figure 7B:
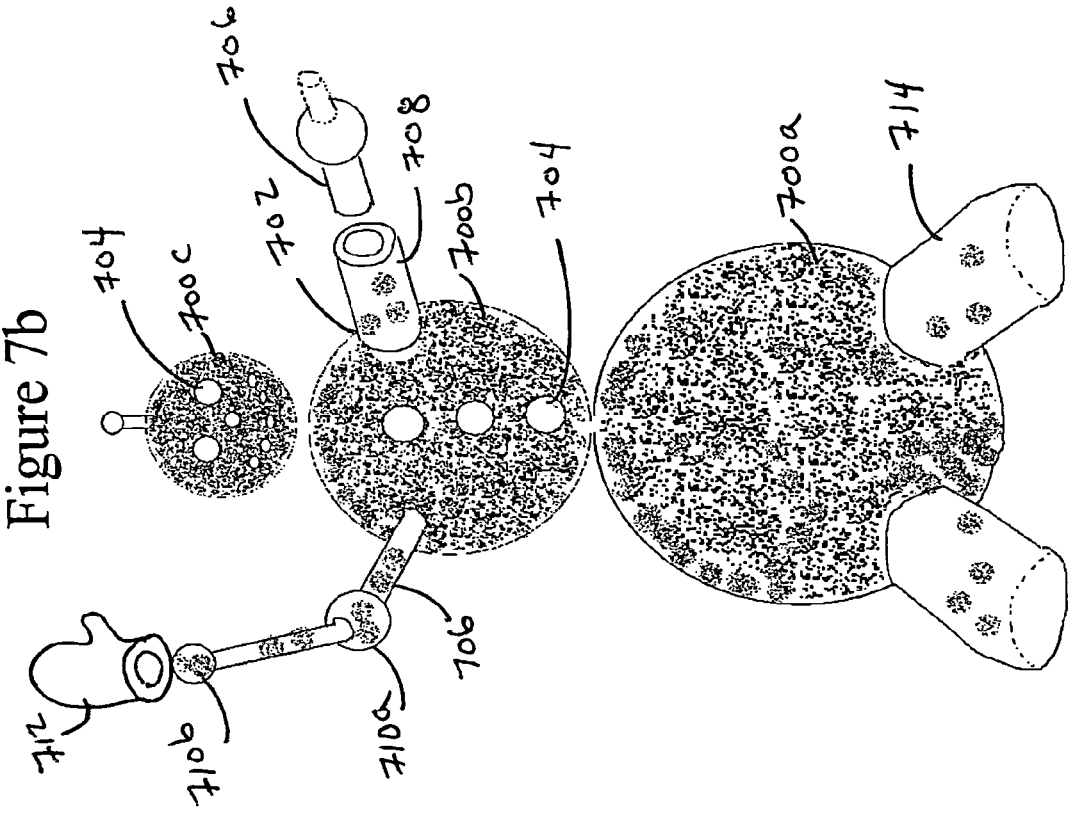
FIGS. 7a-b illustrate compositions of the invention.
Figure 7A:
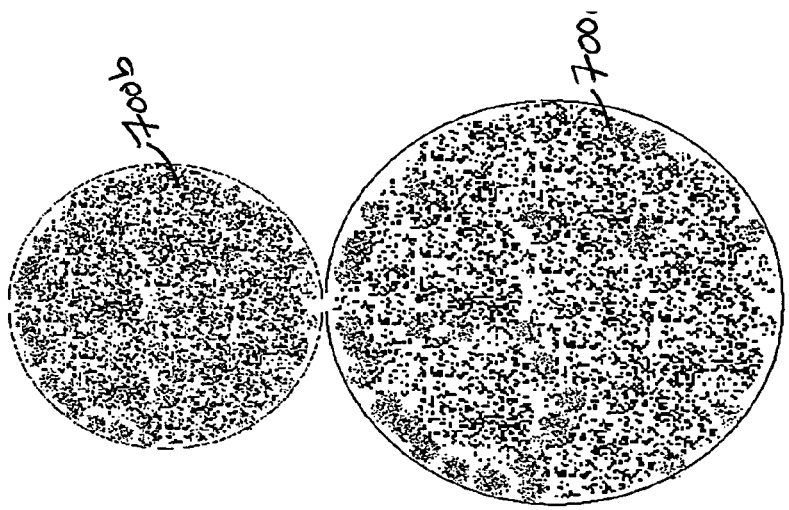

The invention further encompasses the compilation of the snow spheres together. FIG. 7a illustrates two snow spheres stacked on top of each other. FIG. 7b illustrates three spheres stacked on top of each other, namely the snow sphere trunk, torso and head 700 a, b, c, stacked on top of each other. Of course the invention encompasses the compilation of any number of snow spheres of the present invention.

FIG. 7b illustrates a further aspect of the invention, namely attachments. The attachments facilitate the building later of the appendages or features of the snow man/woman. In one aspect, the attachments comprise a receiving portion or socket 702, such as a depression or hole in the snow sphere and a mating stalk. In another aspect, there may be depressions 704 that receive facial or decorative features, such as buttons. Turning now in more detail to the attachments, they may be an armature attachment for a left or right arm 706 and may comprise several attachable or pre-attached parts. There may be, for example, a sleeve 708 for receiving another attachment. There may be, for example, joints, such as an elbow or a wrist 710 a,b, respectively. The joints may be formed with pre-placed holes to receive corresponding appendages. There may also be a hand or hands, which are shown here in the shape of a mitten 712 having a corresponding hole sized to mate with the wrist joint 710b.

The joints may also comprise a ball bearing, hinged, or equivalent movable joint. With the moveable joint, the builder may pre-set the appendages in various positions, such as a hand waving. The joints may be lockable joints, such as a ratcheted joint. The details of joints and locking joints will not be discussed in detail as such technology is widely known.

The attachments may also comprise a leg, or trunk stands 714. Trunk stand receiving portions, such as a stem or hole, are strategically place on the snow sphere in order to balance the trunk show sphere and the supporting load. The attachments may also include a stem for receiving the hat (or bonnet) of the snow man or woman. As shown in the figure, the attachments may also have a snow adhesive outer surface, similar in construction to the adhesive surface discussed above for the snow sphere.

In operation, the snow spheres are constructed and laden with snow. This may be done by applying a layer of snow, as discussed above, and then rolling the snow sphere in snow. This may also be achieved by patting on the snow. The snow spheres may also be prepared simply by rolling the snow spheres in snow and allowing the adhesive surface to collect the snow. The snow spheres are then placed on top of each other. This is no problem because the spheres are much lighter than a normal snow boulder. Alternatively, the snow boulders may be placed on top of each other and then the snow is patted on. However, this is not so easy because the snow covered snow spheres balance better when placed on top of each other.

The snow does not collect in the holes where the attachments are to be placed, allowing the builder to insert the attachments into the snow sphere. Of course, the builder manually positions the snow spheres in the correct orientation so that the left and right arms, hat attachment, etc. are in the correct position. In the case where the invention includes the variant of the adjoinments, then the attachment holes are pre-placed in the corresponding positions relative to the adjoinments. In this latter case, the builder need not worry about the orientation since the adjoinment of the snow spheres will automatically align the attachments and associated holes or attachment points.

Figure 8A:
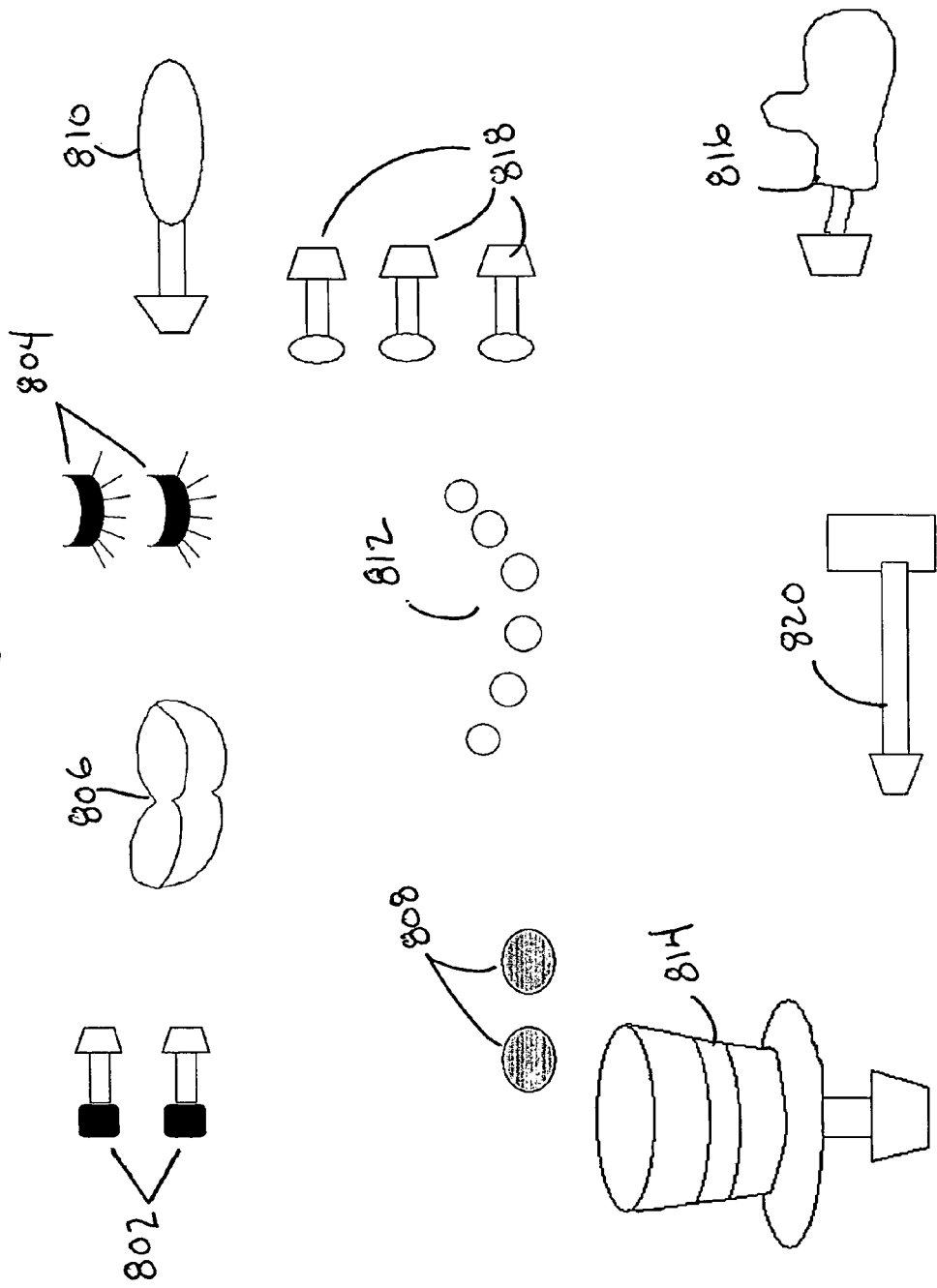
FIG. 8a illustrates attachments of the invention.
Figure 8B:
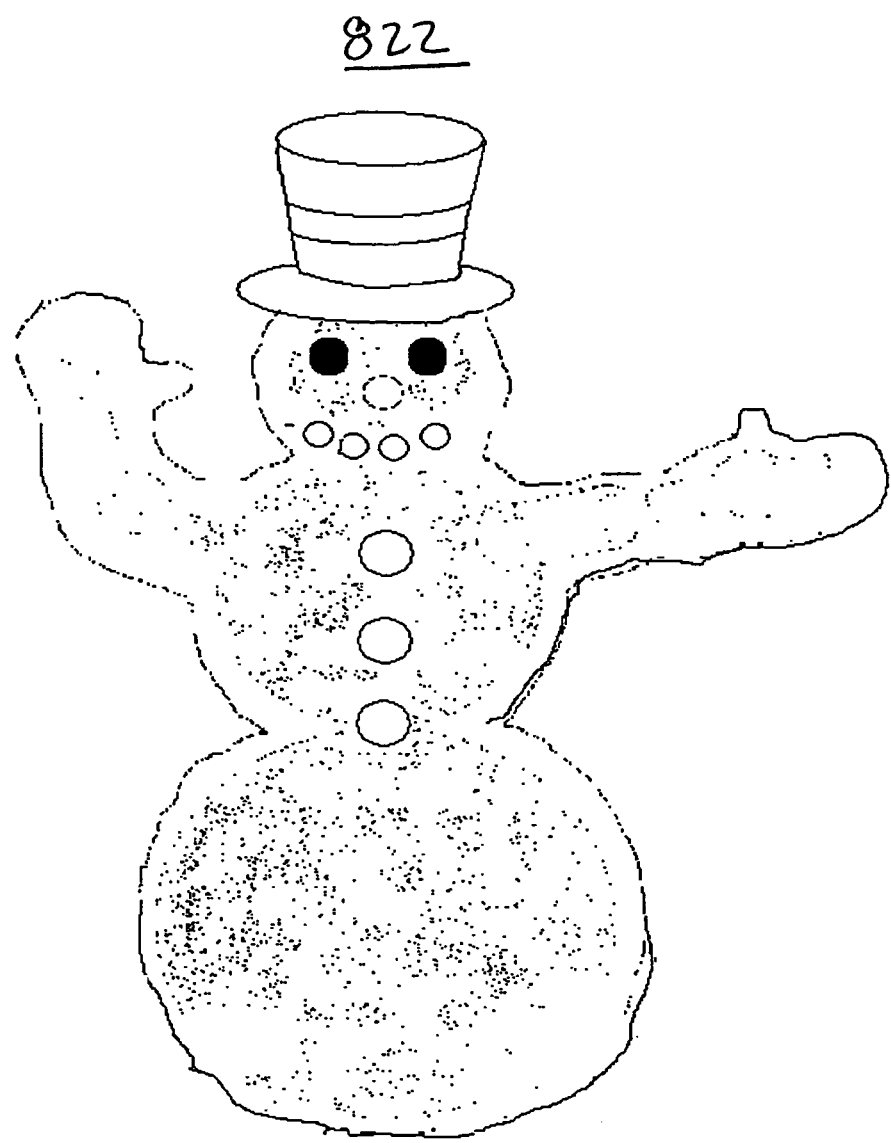
FIG. 8b illustrates a possible final product of the invention.

Turning now to FIGS. 8a and 8b, we come now to the accoutrement aspect of the invention. As mentioned above, wind and melting tend to alter the position of the features and decorations of the snow man/woman. Also, the quality of the snow effects the placement of such accoutrements. Cold snow has a poor friction coefficient, as compared with wetter or moister snow. Thus, the present invention provides accoutrements or accessories that include attaching mechanisms that allow the accessory to be firmly attached or inserted into the snow of the snow person and fixedly placed.

As shown in FIG. 8a, there are various attachments. In one aspect, there are provided facial features, such as eyes 802, eye lashes 804, lips 806, rosy cheeks 808, nose 810 or mouth 812. Of course, not every variation of the attachments is shown. The eyes, here, are shown to be made out of black, coal brick-like, members. However, any type of eyes, including those with pupils, may be used. The lips may be in any form, not only together as shown here, but open, pursed, smiling, with teeth, etc.

The attachments may also be decorative or clothing. There is a top hat 814, mittens 816, buttons 818, or corn pipe 820. Of course, there may be other attachments, such as a scarf, or other adornment. Also, the attachments shown here are not the entire range or scope of items shown. The hat may be a baseball or school-boy cap, a bonnet, a wizard hat, a cowboy hat, a preacher hat, a fisherman's hat and on and on. The mittens may be replaced with a hand, a gloved hand, a baseball mit, etc. The buttons may be any shape or color. The pipe may be a cigarette, a lollipop stick, etc.

The attachments are provided with means to attach the accoutrement. Here, a stem is shown attached to the accoutrement at the insertion end of the item. There may also be a barb, spade-shape or arrow-shaped spear head. The graded side is inserted first into the snow and the blunt or orthogonal side faces the outer surface of the snow. The orthogonal side acts against the snow, making it more difficult to remove the inserted attachment. The spade is contemplated as the better of these options to prevent injury to children or adults. The attachment may be twisted, like a key in a lock, once inserted in order to align the orthogonal side with snow. There may, alternatively, be provided a screw or cork-screw style attaching mechanism.

FIG. 8b illustrates the finished product. The ultimate snow man 822. The ultimate snow man is not to be defined by the adornments or appendages but, rather, chiefly defined by its shape. The symmetry of the snow spheres is a factor better than that can be achieved using the traditional snow person building style. More than that, the ultimate snow man/woman is more easily built, taking far less time than in the past. Of course, the attachments and arm appendages add to the superiority of the ultimate snow man/woman over the snow people of afore. Additionally, the size of the ultimate snow person can be made much larger than normal, owing to the ability to easily manipulate and heft the snow spheres.

The present invention also comprises a method of manufacture. Various ways in which to manufacture the invention are contemplated. In one variation, it is contemplated to construct a spherically-shaped body. The spherically-shaped body has an outer surface and an interior. The interior should be constructed to have a substantially lighter weight than when the interior is filled with snow. An adhesion surface is formed on the outer surface of the spherically-shaped body that substantially increases the ability of the outer surface to adhere snow to the spherically-shaped body, thereby forming the building block for facilitating the construction of the snow man/woman.

Figure 9:
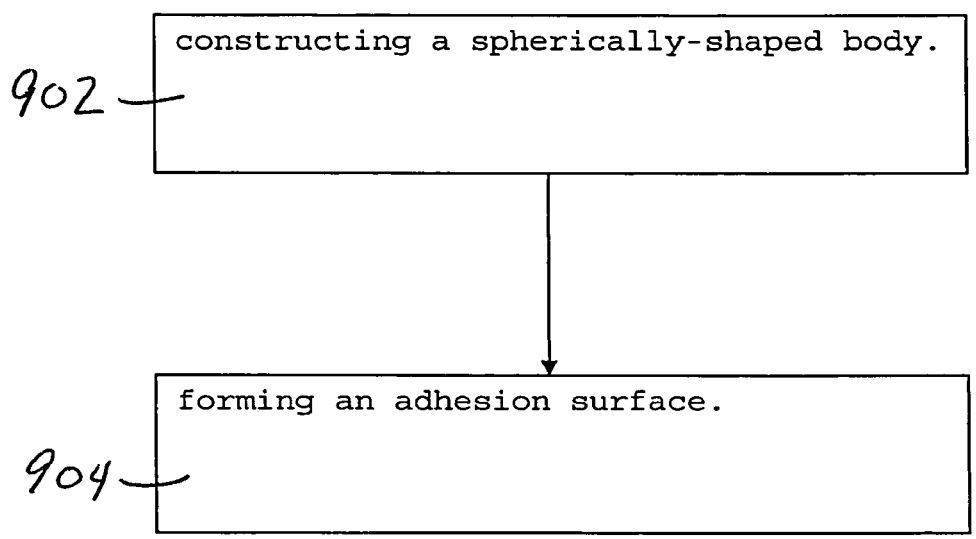
FIG. 9 is a flow diagram for manufacturing the invention.

The fundamental method 900 is shown in FIG. 9. In step 902, the spherically-shaped body is formed. Coinciding, or thereafter, the adhesion surface is formed on the outer surface of the spherically-shaped body in step 904.

The invention manufactures the snow sphere, in one concept, by using a mold. In one aspect, the spherically-shaped body and adhesion surface together are formed in the same mold. For example, this may be ideal for a snow sphere created from plastic, hard rubber, or some other mold-amenable material.

The snow sphere may be formed in another manner. In the case that the snow sphere is made with holes or openings as the adhesion surface, the adhesion surface holes may be created by boring holes into the spherically-shaped body. In the case that a mold is used, the openings may be formed by including protrusions in the mold corresponding with the openings.

The invention also contemplates manufacturing different sizes of the spherically-shaped body for respective body members of the snow man/woman. In a variant, the invention provides at least two sizes of the spherically-shaped body corresponding to respective body members of the snow man/woman.

Figure 10A:
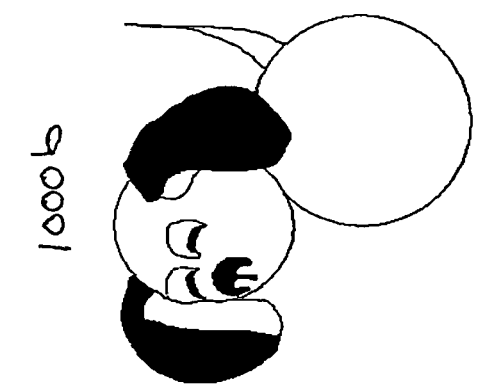
FIGS. 10a and 10b illustrates a variant on the caricatures of the invention.
Figure 10B:
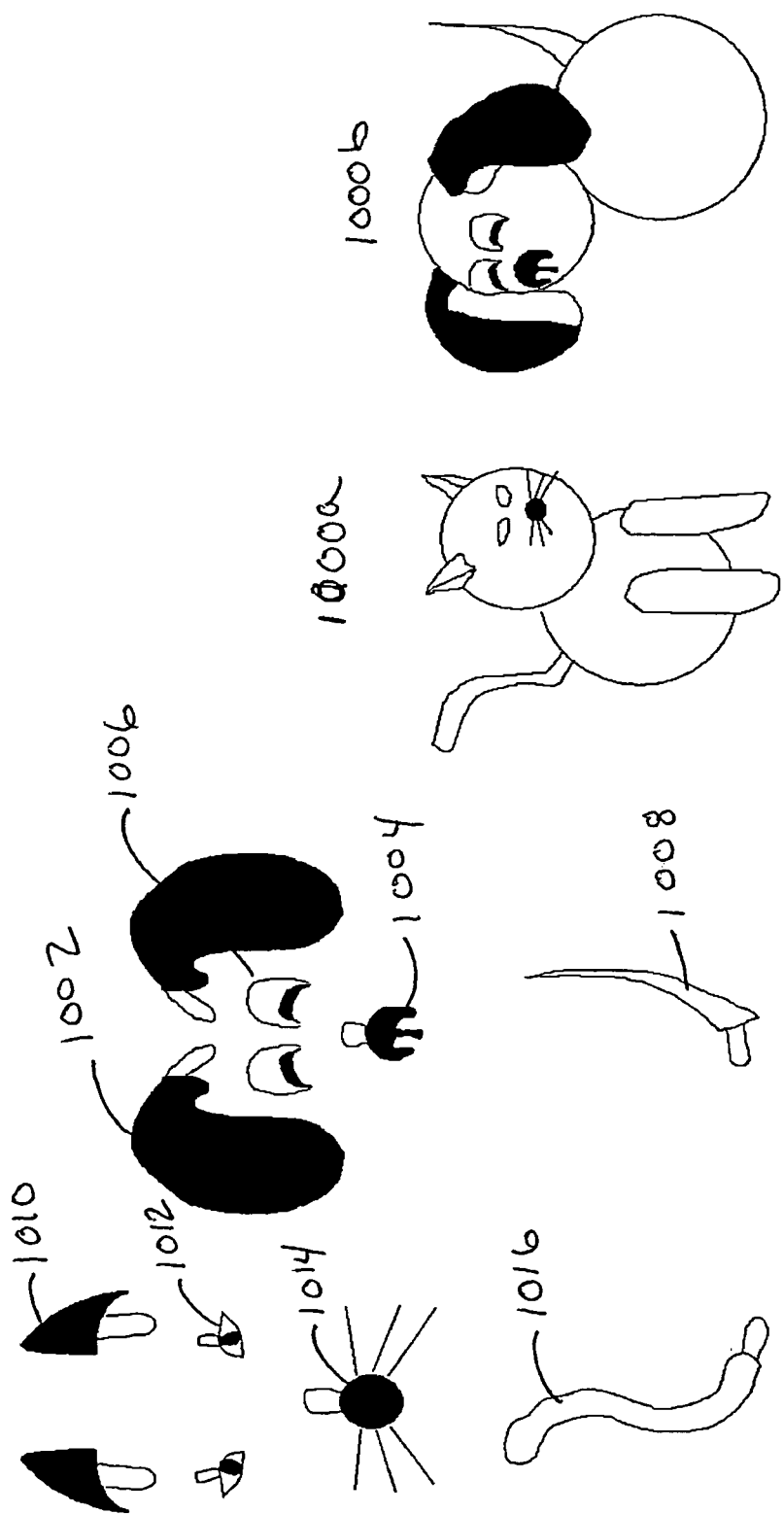

While the main invention envisions providing a snow sphere or spheres for a snow person, it should be born in mind that the invention also encompasses a snow humanoid. In the case, for example, that the person building the snow man wishes to build a snow monster, this should not matter to the invention. For that matter, the invention encompasses a snow animal, such as a cat 1000*a* or dog 1000*b* as shown in FIG. 10*a*, or an exotic animal, such as a giraffe or elephant, or any other animal for that matter. FIG. 10*b* illustrates attachments for the snow animal including doggie ears 1002, nose 1004, sappy eyes 1006 or waggy tail 1008. Alternatively, for the cat version, there may be provided cat ears 1010, Siamese eyes 1012, nose and whiskers 1014 or poofy tail 1016. Of course, these features may also be other than that shown.

Another example of a humanoid would be an alien. An additional feature of the invention is to provide snowman kits, whereby the accoutrements, for example, face and/or body parts/clothes/accessories are sold separately in packets for each type of snow being.

The present invention has been described with reference to specific embodiments or variants. However, it shall be born in mind that modifications or variations to the present invention may be practiced and are still within the spirit and scope of the present invention.

The nodules or depressions may be in a variety of forms. In one form shown in FIGS. 11-15, there are shown snow hooks. The snow hooks are inserted into the snow and the snow is caught between the hooks. By operation of snow sintering, the snow partially melts and deforms, thereby conforming to the shape of the recess formed between the snow hooks. The snow caught and/or sinter formed between the hooks extends partially out of the recess and forms the snow layer to adhere further snow.

The snow hooks may be considered a separate device to attract snow. In cooperation with the snow boulder, the snow hooks capture snow while the snow boulder is rolled. The snow hooks act to maintain the snow on the surface of the snow boulder while the snow boulder is being rolled. Of course, the user can add snow manually by scooping up some snow and applying the snow to the hooks. However, by action of rolling, the user obtains a leverage advantage of the weight of the snow boulder and her or his own weight translated to the other side of the snow boulder that is in contact with the snow. By action of pressure, the snow boulder raises the temperature of the snow, and compresses it, and the snow deforms into the recesses between the snow hooks by action of snow sintering as already explained.

Now turning to a more detailed explanation of FIGS. 11-15, there is shown a non-exhaustive arrangement of different variations of the snow hooks. An analogy of the shape of the snow hook may be made to a conventional hook for convenience of description. A distal end forming a point or barb of the snow hook may have a protrusion that hooks the snow. Unlike the conventional hook, the snow hook protrusion does not have to be sharp or pointed and may have a flat surface. The distal end may also form a head of the snow hook that engages and penetrates the snow. A recess or gap underneath the head forms a region where the snow is captured.

The snow hook may be shortened to have a low profile or lengthened to extend into the snow. The protruding portion, which may be considered a shank of the hook, may be provided to form a greater recess in which the snow can enter and be captured between the snow hooks. The protruding portion may be at any angle to the plane forming the snow surface, and may also be of various shapes, such as straight or curved.

The length of the protruding portion may be selected according to the depth of the snow, or whether the snow is fresh or sinterable snow. The ability of the snow to be sintered may be effected by age of the snow or its moistness. As explained below, different lengths of snow hooks may be employed to capture different levels of compressible or sinter-able snow. By providing a variety of different lengths of snow hooks, a range of different snow types and depths can be selected.

The snow hook may further include a head section, which may be flat on the snow engaging side, rounded or pointed, that is part of the distal end and directed or shaped to engage and penetrate the snow. In this regard, the head section may engage the snow directly, at a perpendicular profile or at an acute angle with a plane forming the snow surface. In this regard, a snow hook is different than a conventional hook as the head is shaped to penetrate the snow.

The gap between the head and other snow hooks or base to which the snow hook is attached forms a recess or opening where the snow is collected and captured. The gap may be made larger by shaping or lengthening the protruding portion. In one aspect, the gap may form a concave opening to allow more snow to be captured therein.

The snow hooks may also be formed in a manner that encourage or guide snow into the recess in order to better capture the snow. For example, the head and/or barb is formed to have a surface that is angled to guide the snow into the recess area. The angle may be with respect to the surface plane of the snow. In another aspect, the recess may be widened, by selecting the appropriate width for the type of snow. In yet another aspect, the snow hook may be angled such that the mouth of the recess is widened on the snow engaging side than the portion that connects to the base. In another aspect, the head surface area is minimized or made into point to better penetrate snow. In this last aspect, snow that is granular or crusty is more easily penetrated by such an arrangement.

Figure 11A:
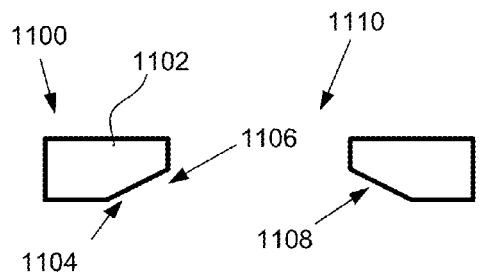
FIG. 11a-h show various hook shaped nodules.

Now with respect to FIG. 11*a*, the snow hook 1100 may be in a shortened or truncated form with the head portion 1102 closely or directly attached to the base 1104 such that the recess 1106 is formed in close configuration with the base 1104. The gap 1106 forms a recess under the head. A barb or narrowed section 1108 between opposed snow hook heads may be spaced deliberately to provide an opening 1110 between heads of snow hooks according to the type of snow and its sinter-ability.

In general, easily sinter-able snow is capturable with larger openings than snow that is not so easily sinter-able, such as dry or crystalline case. In the latter case, a smaller opening 1110 relatively is more adequate for capturing and adhering dry snow.

FIG. 11*a* illustrates a specific shape, having a flat head portion 1102, flat or stubbed intervening portion between head and barb, and an angled barb 1108 that is angled to open the recess increasingly to form a larger opening toward the base (here situated toward the bottom of the page).

However, the snow hook is not limited to this shape and may take on variations of this shape and angles. The various figures that follow illustrate only some of the variations and are not exhaustive of the snow hook.

Figure 11C:
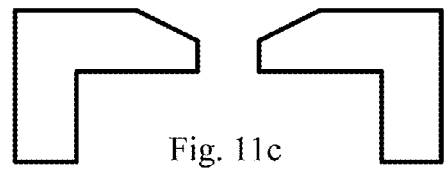
Figure 11B:
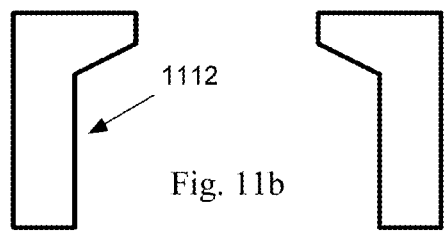

FIG. 11b, for example, illustrates the case where the head portions 1102 are distally extended away from the base by a protruding portion 1112. The length of the protruding portion is selectable in consideration of snow type and sinter-ability. Here the barbs are angled as shown in FIG. 11a. In this arrangement, this allows more snow to be captured in the recess, and also allows the snow to more easily enter the recess and fill in under the head portions. In this manner, the snow hook captures and adheres snow within the recess.

FIG. 11c illustrates another arrangement where the barbed side is not angled and the head portions are extended closer together with respect to FIG. 11a or b. An angle is formed on the top side of the head that abuts the snow in order to form slides or guides that guide the snow into the recess. This arrangement may also be more advantageous for granular snow that can enter a smaller hole but get trapped inside and not easily come out.

Figure 11D:
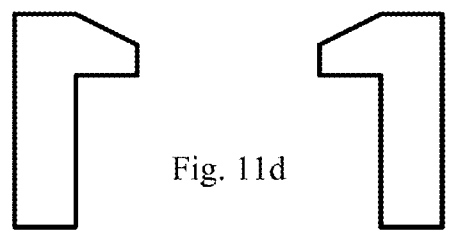

FIG. 11d further illustrates the case where the protrusion portion is longer and the space between the snow hooks is widened.

Figure 11E:
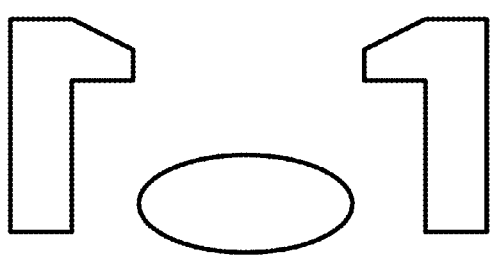

FIGS. 11e and f illustrate an additional feature of the snow hooks including a guide 1114 that guides the snow when the snow acts against its surface. The guide in FIG. 11e takes the shape of a button or bump. In another arrangement shown in FIG. 11f the guide is pointed or curved on one or more sides. The guides may be situated on or near the base in the recess in the figures, but may be arranged in another location within the recess. In these cases, the guides act to push the snow away from the center of the opening and under and up into the area underneath the barb as generally indicated by the curved arrows. The guides also serve to provide a pressure mechanism to hold the snow therein snugly by providing opposed surfaces between which the snow is jammed and sintered into place. This opposing pressure shown generally by the straight arrows causes the snow to be wedged or jammed into the recess and stay in the recess. The opposing surfaces essentially form surfaces that have opposing normals to each other.

Figure 11F:
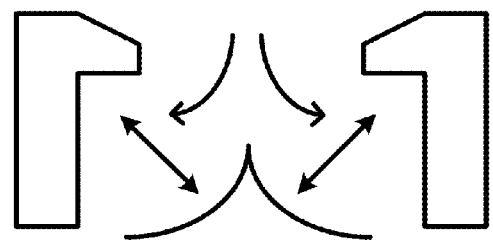

In the one case of FIG. 11e, the guide is made up of a convex or rounded surface. In the case of FIG. 11f, the guide is made up of a concave or indented surface or surfaces. The guide of FIG. 11f is also forms a point formed by intersecting, which may be referred to as a cusp. In three dimensions, the guides may be uniform about its central axis to form a spherical or reverse-spherical shape. Of course, these are merely examples and other guide shapes are within the scope of the invention.

Figure 11G:
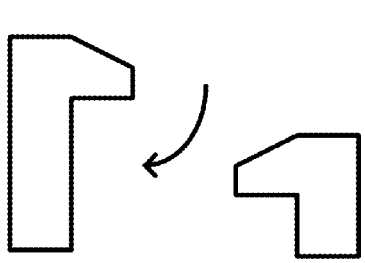

To continue, FIG. 11g illustrates the case where different heights of snow hooks are used. In this case, the snow may enter the recess laterally as well as illustrated generally by the curved arrow. In addition, the different heights allow for different types of snow to be captured by the snow hooks.

Figure 11H:
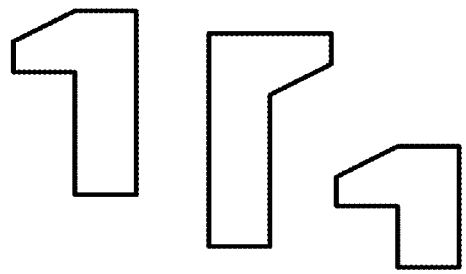

Similarly, FIG. 11h shows that any number of snow hooks and lengths can be mixed and matched. The snow hooks may be placed in a random or semi random pattern, to allow for different types and different approaches of snow to enter the recesses. The randomness also contributes to grabbing snow more advantageously than uniform placements and positioning of snow hooks.

For that matter, it shall be immediately appreciated that any of the shapes and sizes and lengths can be mixed and matched in any combination. Further, any of the shapes for the various components, i.e., the head portion, the barb, the protruding portion, or the guides can be mixed and matched in any combination. These various snow hooks in turn can be mixed and matched in any combination. This randomness contributes to the adherability of the snow as it captures and holds snow from a variety of different angles.

FIGS. 12a-d illustrate another variation of the snow hook. These figures show that the snow hooks may be formed in the shape of plugs or arrow heads. This allows the snow hook to penetrate into the snow like a harpoon puncturing a whale's outer blubber and firmly fixing into the snowy flesh within. Of course, any of these snow hooks can be formed with other features outlined herein. For example, the snow hooks of FIGS. 12a-d can be implemented with guides as shown in FIGS. 11e and f.

Figure 12A:
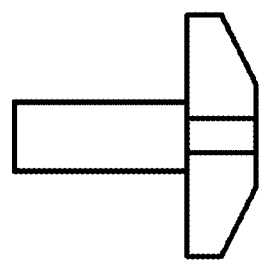
FIGS. 12a-f show plug type nodules.

In one example, FIG. 12a illustrates a snow hook plug with a head portion at the distal end of a protruding portion. Here the protruding portion has a thinner cross section than the head such that snow is captured underneath the head.

Figure 12B:
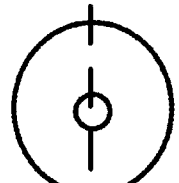

FIG. 12b shows the snow hook plug from the top view has a round or conical shape. This shape is useful for soft snow of high sinter-ability, where the snow hook easily plunges into the snow and captures the snow underneath the head.

Figure 12C:
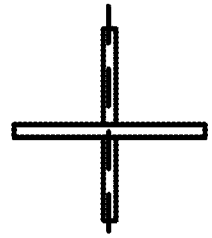

FIG. 12c illustrates another top view showing the head is arrow shaped with flat cross like blades. This shape may be suitable for extremely crusty snow.

Figure 12D:
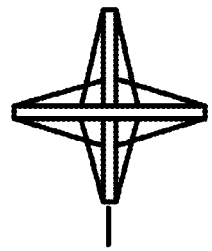

FIG. 12d illustrates the case for in-between snow types, wherein the head portion is formed with a plunger having the double arrow head configuration of FIG. 12c, but with diamond like blades.

It shall also be appreciated that the arrangement of the snow hooks can also have an effect on the capturability of the adhesion surface. A conformal pattern is within the scope of the invention where the snow hooks all line up in rows and columns like little snow troopers all facing in the same direction or orientation. Alternatively or in combination therewith, a non-conformal pattern (the snow troopers are rebelling) the snow hooks are staggered. Alternatively or in combination, the snow hooks are arranged to face each other such that at least one recess faces at least part of another. It shall be appreciated that this configuration allows for the snow to be wedged (no reference to Star Wars™ here) between adjacent snow hooks. In another configuration, the snow hooks are randomly oriented (or semi random since true randomness has not yet been proven) (the snow troopers are taking a cigarette break). In that case, it shall be appreciated that a random configuration allows for capturing different orientations of snow or different snow types. For example, the terrain may be uneven, may have little hills and valleys, and the snow hooks may be more optimally aligned with the terrain if they are in a random orientation.

Figure 12E:
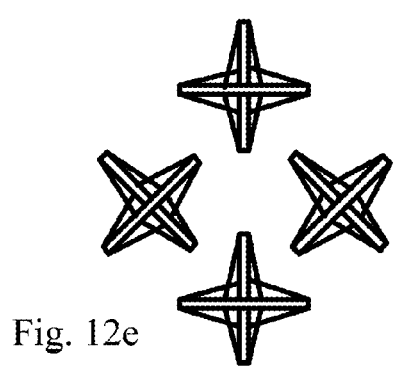

FIG. 12e illustrates the case where the snow hooks are staggered and oriented such that at least one recess of a snow hook is opposite a portion of another snow hook recess to form opposed recesses. These opposed recesses form an opening for snow that, once entered, the snow becomes wedged between the snow hooks and is captured therein by the recesses under the heads of the respective snow hooks. The opposing forces between adjacent and opposed recesses may further improve the capturing aspect of the snow hooks.

Figure 12F:
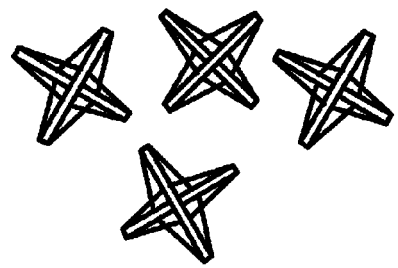

FIG. 12f illustrates the case where the snow hooks are randomly arranged. Again, true randomness is still a subject of debate. Big bang theorists would argue that nothing is truly random, everything being configured from the time of the Big Bang. Which basically means that, as I write these words, that too was ordained from the beginning of time. Strange theory. To continue, the point is that the configuration is random (or semi-random if you are a Big Bang theorist) in the sense that an average person looking at the snow hooks in configuration would not be able to recognize a pattern. In other words, the opposite of random in this context could be considered to have a pattern.

In the above case, any arrangement of snow hook in the form of a plunger is possible. In these figures it is shown that the top of the plunger is flat in order to avoid injury or pain to the naked hand of a user. On the other hand, the snow plungers and the snow hooks may have a raised surface in order to better penetrate the snow (the harpoon/MOBY DICK analogy).

FIGS. 13a-f cover various angled variations of the snow hook. FIG. 13a illustrates the heads with guides formed in the snow engaging surface angled inward toward the base. This forms a more sharply inclined barb that tends to capture the snow more aptly beneath the head.

FIG. 13b shows both the inward incline angle of the heads and the angling of the protruding portions outward. This shape provides strength to the barbs and also allows more snow to enter the snow hook recesses more easily and form more easily underneath the barbs.

FIG. 13c shows where the head and barbs are arranged at 90 degree angles.

FIG. 13d illustrates the case where the protruding portions are perpendicular to the base and the heads are angled inward or downward.

FIG. 13e illustrates the opposite of FIG. 13b where the protruding portions are angled outward away from each other. It shall be appreciated that angling the protruding portions for more than a pair of hooks automatically configures adjacent snow hooks in the opposite (complimentary) angled configuration. In that regard, the snow hooks have both outward and inward angled protruding portions such that different types of snow are accounted for.

FIG. 13f illustrates the opposite case of FIG. 13d where the heads are angled upwards and outwards from the base.

Figure 14A:
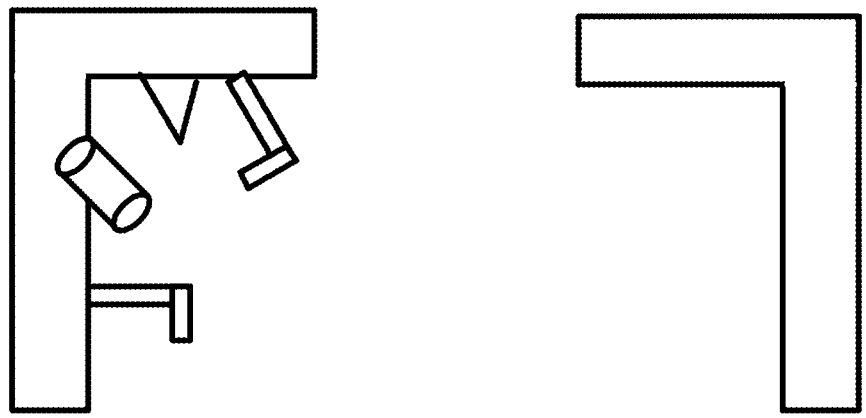
FIGS. 14a-b show combinations of textures including nodules.
Figure 14B:
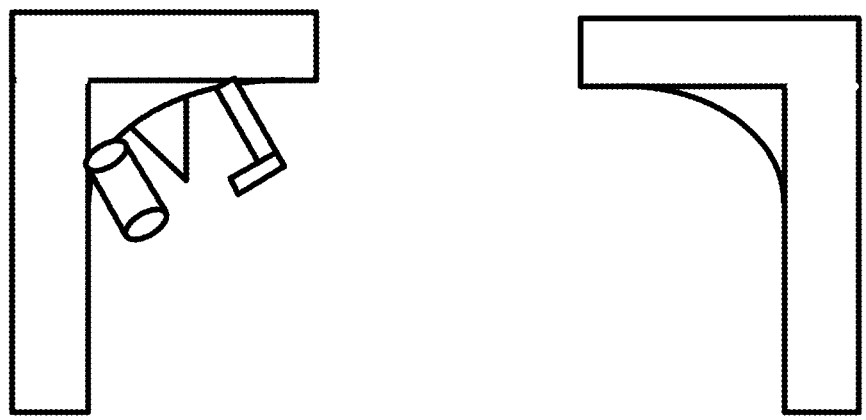

FIGS. 14 a and b illustrate that another variation of the snow hooks may include further hooks inside the snow hooks. This is to capture the snow in a labyrinth of snow hooks once inside the snow hooks. FIG. 14a illustrates the case without guides. In the case of FIG. 14b, guides in the form of sloped walls in the barb region may be formed. Upon these slopes or guides, further smaller snow hooks may be arranged. The internal snow hooks may be formed in various shapes, such as spikes cylinders or L shapes, for example.

Of course, the protrusion portion may be of any length, width or height. In one example, the height may be longer than 2 mm, 5 mm or longer. In one specific example, the length width and height of the protrusion portion is 8 mm, 7.8 mm, and 9.6 mm, respectively, or greater. At a minimum, it is estimated that at least 2 mm underneath the head is needed to provide a sufficient area to capture snow. While there is no maximum for the height of the protruding portion, it could be considered that a layer of 1 or 2 inches of snow would be sufficient to cover the snow surface. In that regard, a maximum height of the protruding portion may be 1 inch. Alternatively or in addition thereto, a maximum height of the protruding portion may be 2 inches. I know I am mixing metric and English units. 1 foot=0.3048 meters. Do the math. Hint: 1 inch=25.4 millimeters. At any rate, a good size height for the protruding portion is about 1 or 2 centimeters, otherwise the snow hooks may be liable to break off.

Furthermore, the tip of the head forming the top of the recess nearest the opening may be square/flat or alternatively tending to form a point. Forming a point would increase the cross section area of the opening, thereby allowing more snow into the recesses. A point or narrowed tip would also allow better penetration into the snow. In this case, the head portion nearest the opening when square may be 7.8 mm or about 8 mm.

It shall be appreciated that the dimensions above are for typical snow conditions. However, for various snow types, such as dry crystalline snow, other dimensions may be appropriate. For example, smaller dimensions than those above may be more appropriate for capturing snow crystals or snow granules. These granules are captured within the nooks and grannies of the snow hooks (Thomas Promises™ another great invention). The smaller dimensions keep the granules in without letting them easily fall out.

Figure 15A:
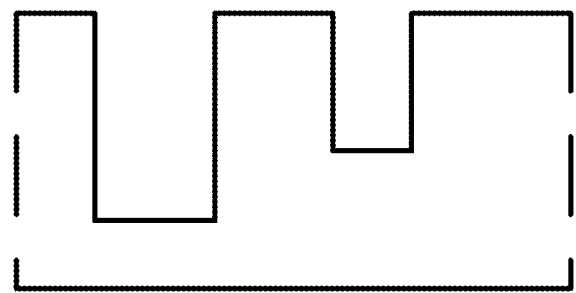
FIGS. 15a-c show openings that capture snow.
Figure 15B:
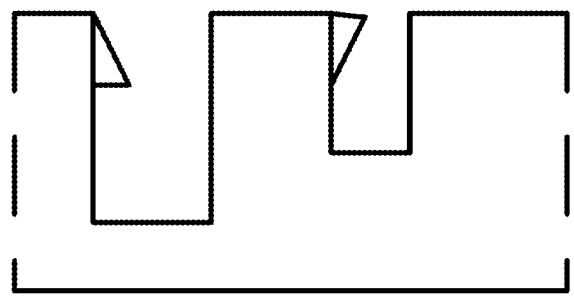
Figure 15C:
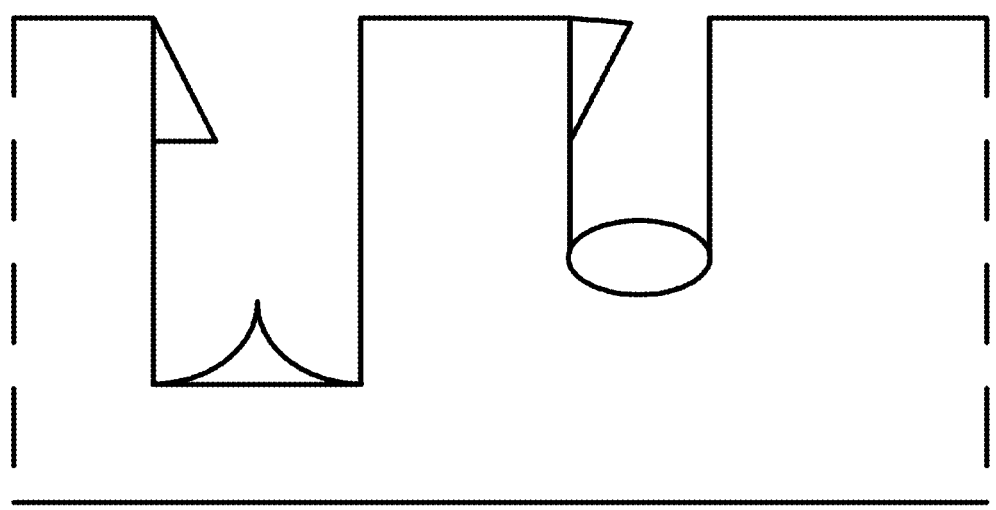

FIGS. 15a-c illustrate another form of nodule may include a closed depression or hole. The hole may have a bottom where material is formed. The closed depressions may be plain and cylindrical as shown in FIG. 15a or themselves have barb protrusions as shown in FIG. 15b. FIG. 15c illustrates the case where the closed depressions include guides similar to FIGS. 11e and f. It shall be appreciated that the closed depressions can have any shapes therein and that the various shapes can be mixed and matched to suit a variety of snow conditions. For example, the closed depression may also have small internal snow hooks inside the opening or recess.

Figure 16:
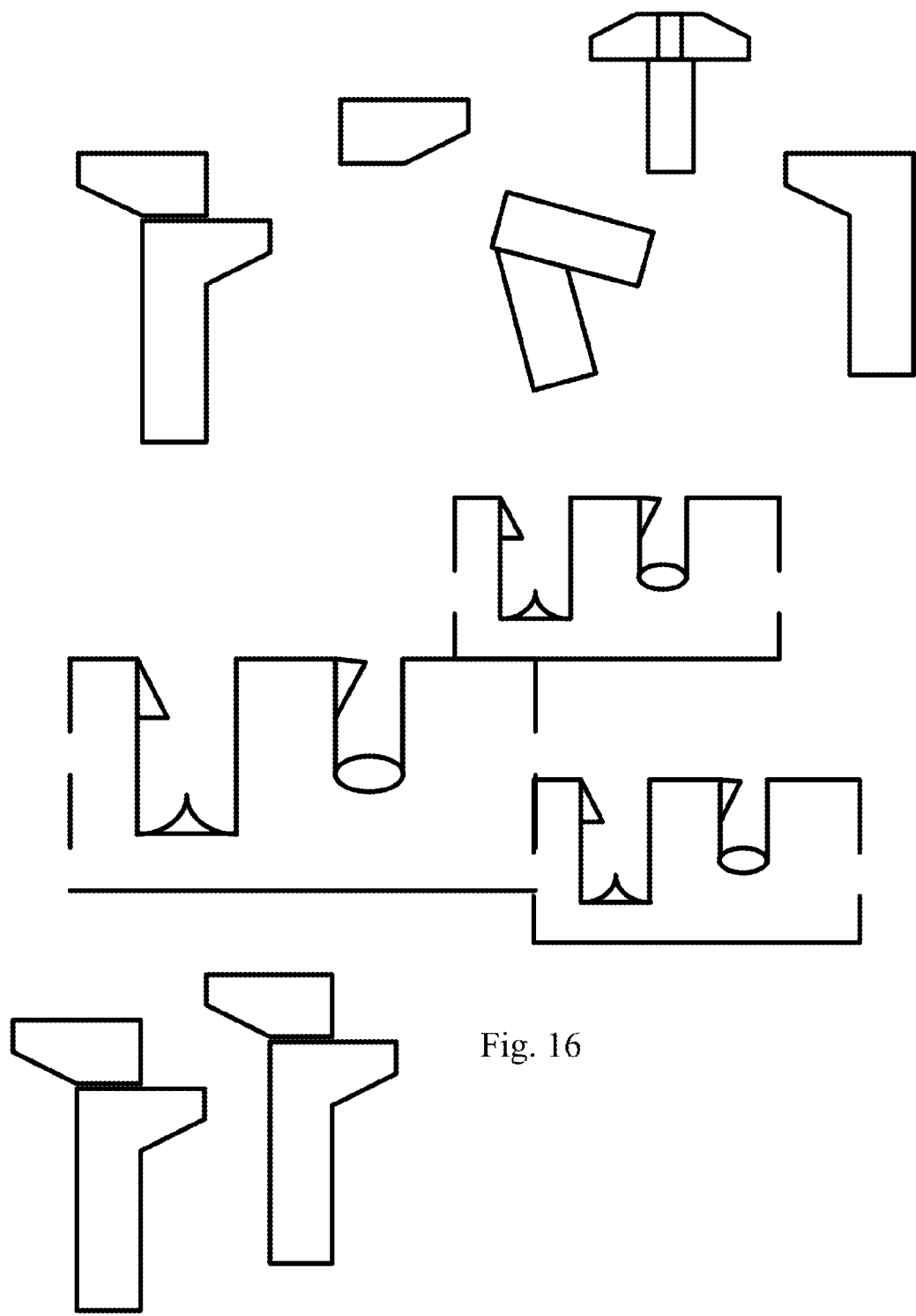
FIG. 16 shows combinations of nodules and openings.

FIG. 16 illustrates that the snow surface can be arranged with any combination of snow hooks. The snow hooks can be mixed in matched in any type, orientation (x, y, z, rotation), and/or angle. The snow hooks can also be combined with the closed depressions and/or plungers. FIG. 16 further illustrates that layers of snow hooks and/or closed depressions can be stacked to form catacombs that allow snow to work their way into the subterranean channels and get wedged there. FIG. 16 further illustrates that the snow hooks can be stacked on each other made of the same or different type of hook, orientations, or angle. In this manner, the snow has more of a chance to get wedged in and under the recesses or opposed recesses. Further, a stacked construction provides different recess orientations for the same protruding portion, thereby reducing the space used by the protruding portion and increasing the space for the openings in-between the snow hooks for capturing snow. The stacked construction also may be advantageous for producing the snow hooks as the heads can be attached on top of each other.

It shall be appreciated that the snow hook of the present invention engages snow and is designed to capture the snow. In one aspect, the snow hook is designed to maintain the snow inside the opening permanently or semi-permanently. That is, all of the snow must be removed from the opening purposely by the user, or by melting.

It shall be appreciated that an advantage of the closed depression is that snow does not fall through an opening on the bottom of the depression, thereby becoming lost or wasted. With the closed depression, the snow is captured in the depression and stays in the depression. The bottom prevents the snow from falling through the bottom and the shape or additional structures inside the closed depression prevent the snow from leaving the closed depression.

The snow hooks described may be used as part of the snow boulder concept, applied thereon, or independent thereof.

It has been discussed that snow sintering assists with the adhesion of the snow to the adhesion surface. Primarily, the sintering is caused by the pressure on the snow caused by a downforce either by the weight of the boulder or by the force of the user applied on the top of the snow boulder translated to the snow engaging surface. Through experimentation, the inventor discovered that weight of the snow boulder is an important element that weighs in on the sintering process. In particular, the balance between weight, where the snow boulder is kept light-weight for ease of manipulation of the user, versus sufficient weight to create enough pressure to trigger sintering, is a factor in deciding which materials and surfaces to employ.

Figure 17:
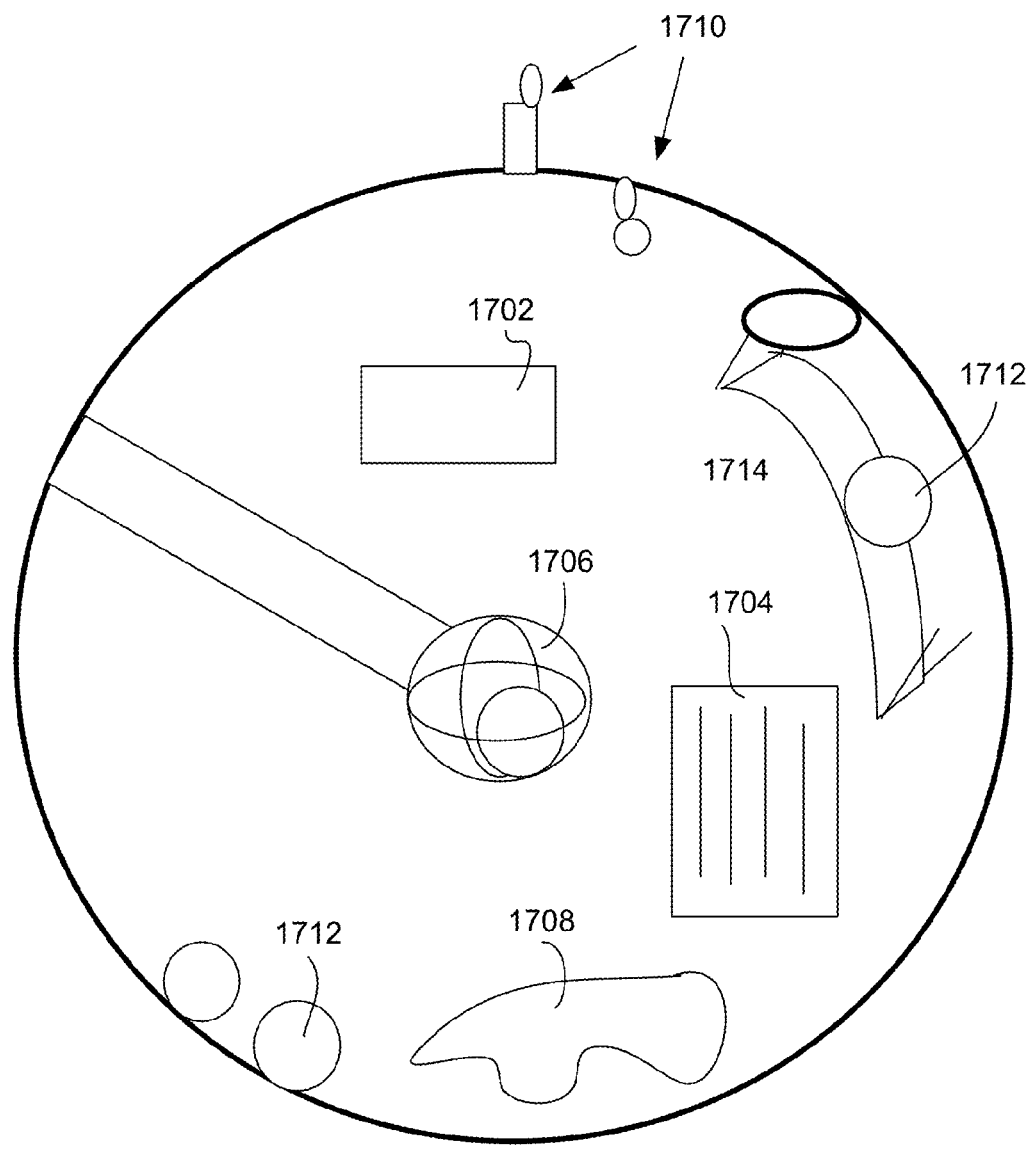
FIG. 17 shows an alternative embodiment of the snow sphere.

In one aspect of the invention, additional sintering or the encouragement of sintering is provided by employing other ways in which to speed or facilitate the sintering process. In one manner, there is provided a heat source inside the snow boulder. The heat source provides heat that is translated to the outer surface of the snow boulder that speeds the snow sintering. The heat source may be passive or active and driven by any type of power source, potential or kinetic energy. The heat source may even be removable in order to initially provide snow sintering and then later be removed to reduce the weight of the snow boulder. Various heat sources are illustrated in FIG. 17, noting that these are not exhaustive of all heat sources possible.

In one aspect, the heat source is provided by an electrically powered heating device 1702. This is installed inside the snow boulder and may be switched on or off via a remote control (wireless control) or by manual switch located on the surface of the snow boulder.

In any of the types of heat sources, a consideration is the location of the heat source such that the heat is evenly distributed throughout the snow boulder to provide even sintering around the entire surface of the snow boulder. The heat source may be stationary, such as in the center of the snow sphere, or non-stationary such that it moves around inside the snow boulder to provide heating to different points of the snow boulder at different times.

Another arrangement provides an insertable heating element, such as a heating pad or heating bottle 1704. For this purpose there may be a closeable opening in the snow boulder to allow entry of the heating element. The closeable opening may have an adhesion element thereon as well in order to maintain the continuous nature of the adhesion surface. The heating pad or bottle may be filled with hot water or steam.

Where the heating source is insertable into the snow boulder, there may be a manner in which the heating element is caught and maintained in a location of the snow boulder. This may include a catch or catches 1706 that catch and holds the heating element in, for example, the center of the snow sphere. The catch may have a release mechanism for later retrieval and refueling of the heating element.

In another aspect, the heating source is allowed to be moved freely through the snow sphere so that the heat is evenly distributed, for example, as the snow sphere is rolled. In one arrangement there is provided an opening in the snow sphere that allows the user to insert hot water or steam 1708 into the snow sphere. The opening 1710 may be closeable in order that the hot water or steam is not released prematurely (premature release). In the case of steam, the opening may be of the pressure valve variety.

In the case of hot water or steam, the opening that is closeable is later opened to release the hot water (the snowman pees) to reduce the weight of the boulder so that it then can be manipulated more easily by the user. In that case the opening, which may be covered in snow, includes an opening that is openable remotely. This may be a lengthened opening, or an exit path, in the form of a tube or silo that extends from the surface of the snow boulder. It may also be attached to a pull string, that allows the opening to be opened and release the water or steam.

Other arrangements are also possible, including heating balls 1712 that provide heat and which can be inserted into the snow boulder. The heating balls may be filled with water or otherwise be made of a high thermal sink. The balls may be inserted into the snow boulder where they may move freely or be maintained by a catch.

In another aspect, the heating source is directed by a guide or plurality of guides 1714 inside the snow sphere that allows heating elements to be guided to different portions of the snow boulder. In regard to use of heating balls, the guides may be keyed by size or shape such that different heating balls, having the appropriate size or shape (or key) are directed like a pool table and cues to different pockets.

In regard to weight, it is an advantage to be able to easily manipulate the snow boulder. In one aspect, therefore, the spherically shaped body, surface and the heating source are substantially lighter than when filled with compacted snow. Of course, this does not have to be the case and other aspects of the invention are advantageous.

It shall be appreciated that the heating source and its variants is applicable alone or combinable with any of the other aspects, including the snow hooks or closed depressions and any of its forms and combinations.

It has been noted during testing that snow tends not to form on the tops of the impinging surfaces. Hence, it is advantageous to reduce the surface area of the impinging surface as practical and possibly to a minimum. Alternatively or in addition to it is also advantageous to increase the cross sectional area of the opening in order to receive more snow into the snow receiving opening.

The surface area forming the impinging surface in one arrangement may be less than a total surface area between the impinging surfaces formed by an imaginary sphere intersecting the impinging surfaces.

It has also been observed in creating models for a potential snow hook that a snow hook as described affects snow in primarily two dimensions, that is, in the Z direction into the snow receiving area and the X direction toward snow receiving opening. However, in configuring snow hooks in plurality, it is advantageous to provide snow receiving, adhering and capturing capability all around the Z axis, that is the longitudinal axis of the protruding portion.

A configuration that takes into account the 3rd dimension or 360 degree radius around the snow receiving area is advantageous. In this manner, snow may be captured about the entire area around the protruding portion. In addition, this configuration allows other snow hooks or snow receiving areas to be configured around the snow hook without requiring further snow hooks or protruding portions to be arranged back to back. This increases the amount of snow hook area and hooking effect, while minimizing spaces that may not actively hook snow.

It has been invented that, by taking an individual snow hook and rotating it about its longitudinal axis, one would obtain an object having a cross section that may be considered as spear shaped. From the top this would resemble a plunger like in the embodiments shown with the plugs. Of course, the hook does not have to form a continuous area all about its longitudinal axis, such as shown with respect to the diamond or cross shaped plugs, but this is merely an example.

In any event, returning to the plunger, it shall be appreciated that a plunger with such a configuration may be placed in conjunction with other similar plungers all about the longitudinal axis, thereby providing a configuration that leads to snow capture all about the longitudinal axis. Of course, physically there will not be enough space to have an infinite number of plungers or snow receiving openings all about the axis and there will be a limited number thereof.

Figure 18:
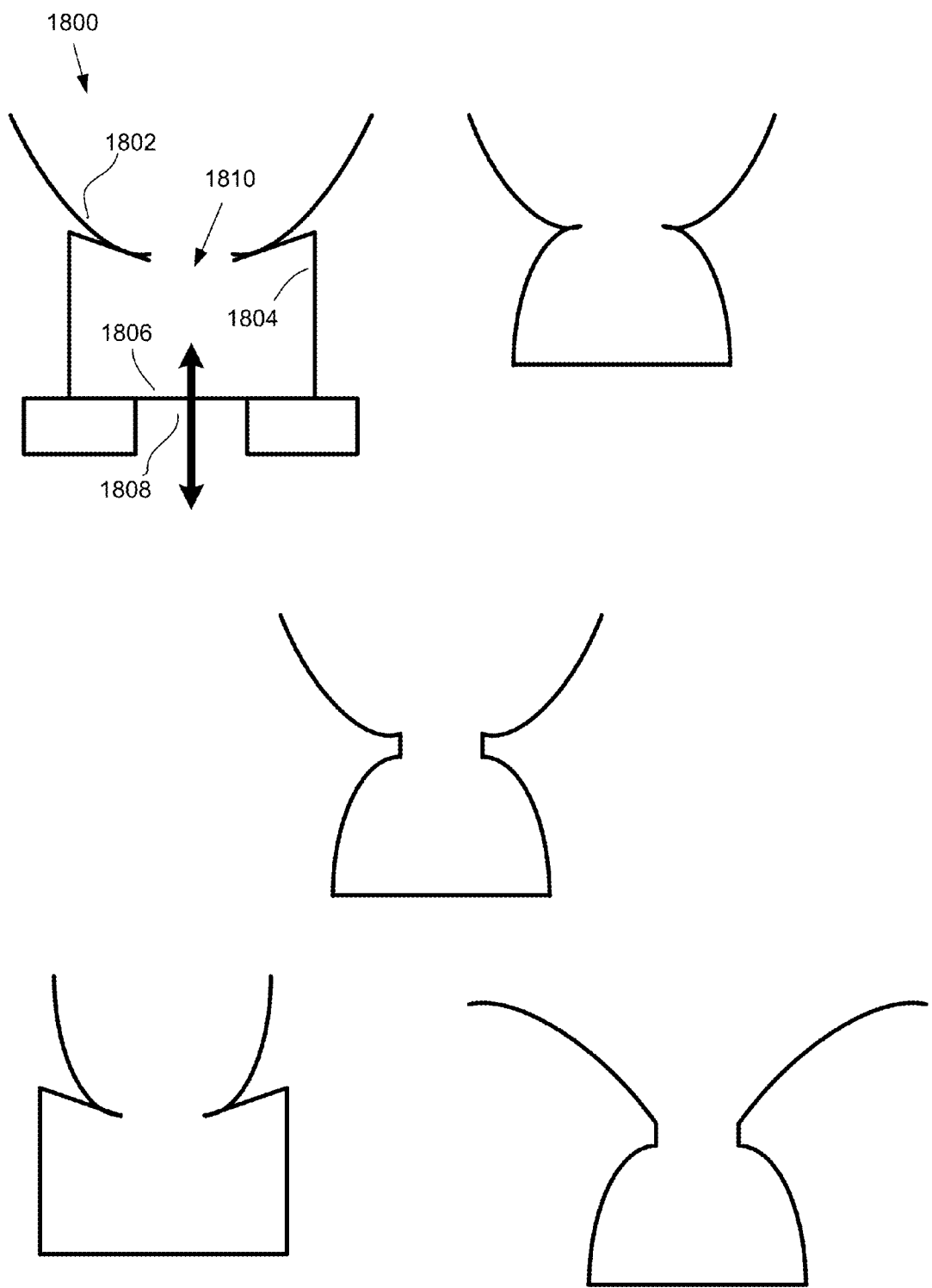
FIG. 18 shows an alternative embodiment of the nodules.

In another aspect, rotating the hook about an axis in the center of two hooks forms an opening as shown in FIG. 18. Essentially the openings also form hooks about the edge of the openings. These are like in the foregoing arrangement to be 3-dimensional or 360 degree hooks.

Further, guides may be used to guide the snow from the impinging surface (or a plane forming an imaginary impinging surface around the snow boulder) to and into the opening. It shall be appreciated that having a guide in conjunction or adjacent with the impinging surface is advantageous. The guides provide a surface or surfaces that direct or guide snow toward the opening and into the snow catching and capturing area. In one aspect, the guides are convex and in another they are concave. However, as explained in order to maximize the opening, it is advantageous to provide a concave guide or substantially concave guide that is on the whole (or a majority of the area thereof), forming a concave surface.

The 360 degree hook may be combined with a guide on the impinging surface. In the case of the 360 hook resembling the plunger, the guide is a slope that slopes downward from the top or point of the plunger. In the case of the 360 degree hook forming openings, combing the guide creates a ridge. In the case of minimizing the impinging surface, the ridge may be pointed or be substantially pointed in-between the snow receiving areas. Of course, the ridge may have a flat surface in order to avoid a sharp surface to prevent injury to the user.

It shall be appreciated that the 360 degree hook has portions inside the snow receiving area that are opposed about all 360 degrees. Thus, there is a double advantage of the 360 degree hook in both providing a configuration that allows a plurality of hooks to be arranged there around and further that the open area itself includes the opposed sections.

From impinging surfaces or points first contacting the snow, the surfaces therefrom are in toto angled toward the opening. That is, they are angled inward. Not all of the surfaces need to be angled inward but at least a majority.

The edge between the guide and the overhang may be thicker than a point in order to provide strength to the hook, and provide some protection to the user by removing a sharp edge.

Vacuum Device or Vacuum Creating Device.

During modeling of the snow hooks it was observed that a vacuum is created when rods are inserted and removed into modeling clay to form the snow hook openings. The vacuum was so dramatic that I concluded that it would be useful and inventive to employ suction or vacuum or negative pressure to literally suck the snow in.

Henceforth, a discussion of various vacuum or negative pressure creation devices will now be discussed. Of course, the vacuum device may be incorporated or not with the inventive snow boulder, snow hooks or openings, etc. FIG. 18 shows several different variations of a vacuum device 1800 incorporated with a snow hook arrangement, which may include snow guides 1802 that guide the snow into the opening 1810 where it is captured by the snow hooks 1804.

The vacuum device may in one aspect include a diaphragm 1806 coupled to the bottom of the snow receiving area. The diaphragm would form therein a closed container or tube in order to provide a closed pressure or negative pressure area between the snow and the adjacent portion of the snow receiving area. It may be made of a suitable material such as elastic rubber. And when incorporated into the snow boulder may be lined on the interior of the snow boulder. An opening or hole 1808 may be provided in the snow boulder to allow the diaphragm to extend therein. The hole 1808 may have a diameter smaller than the base of the snow hook arrangement 1800 in order to provide a portion of the snow hook arrangement that holds the snow as a stopper and an area that allows the diaphragm to extend into.

In operation, the snow enters the snow receiving and capturing area. The mass of the snow (observing that snow includes or associated with a Higgs boson and thus has mass), fills up the space and closes off the opening. The snow with further pressure impinges on the diaphragm on the bottom of the opening or surface and pushes inward, extends or otherwise and engorges the diaphragm. At the inward end, the snow forms a penetration of the snow into the snow boulder enveloped by the diaphragm. The extension of the diaphragm increases the area inside the snow receiving area, thereby causing a vacuum or negative pressure.

FIG. 19a illustrates top views of a possible snow hook arrangement with a plurality of snow hooks 1900. In accordance with the aspect of reducing the impinging area of the snow boulder surface with that of the snow, there may be formed ridges 1906 in between the openings 1904 of the snow hooks (FIG. 19b). The ridges may form any geometric shape, such as a triangle, rectangle, square, pentagon, hexagon, octagon etc. Depending on construction limitations, the openings may be formed by a lip 1902. Or the openings may form a smooth surface as also shown with respect to FIG. 19c As shown in a cross section FIG. 19c, the points between the ridges may form guides 1908 that guide the snow into the opening. The guides may be concave or convex. However, it is believed that concave slopes may be more suitable because they provide more volume for snow to collect in the opening. On the other hand, the narrower opening of a convex slope may be better for some snow conditions like wet snow to offer a confined space to grab the snow. It was recently learned in testing with wet snow that wet snow tends to clump together and form heavier clumps than dry snow and the capturing area or adhering area needs to be either stronger or smaller for those conditions. That said, the slopes or guides may simply be straight.

In another arrangement (FIG. 20), the vacuum device and snow hook arrangement 2000 is provided alternatively or in addition thereto by a sliding protruding member 2002 that forms the snow receiving area and slides inwardly. When coupled with the diaphragm 2004, the sliding protruding member engages the ground or snow on the ground at the distal end and is pushed inward, thereby causing the inner end to engage and act on the diaphragm. The extension of the diaphragm increases the area inside the snow receiving area, thereby causing a vacuum or negative pressure.

Alternatively or in addition thereto, there is also provided a locking mechanism 2006 that locks the sliding protruding member so that the snow is not ejected after the sliding protruding member disengages from the ground or snow on the ground. The locking mechanism may be a clasp or ring at the opening of the snow receiving area. The clasp may have a slanted portion for allowing the distal end to push the clasp momentarily outward and then snapping shut once the distal end moves past and underneath the clasp.

There is also provided a disengaging device that disengages the locking mechanism once the snow melts and the user wishes to reset the snow hooks into snow receiving position.

In another arrangement, the vacuum device is provided by a separate device such as an evacuation pump that translates a negative pressure to the open areas, for example, within a sealed snow boulder or by tubes, a series of tubes or catacombs. In this regard, the vacuum device may be integrated inside the snow boulder or external thereto.

Snow Glow

Figure 21A:
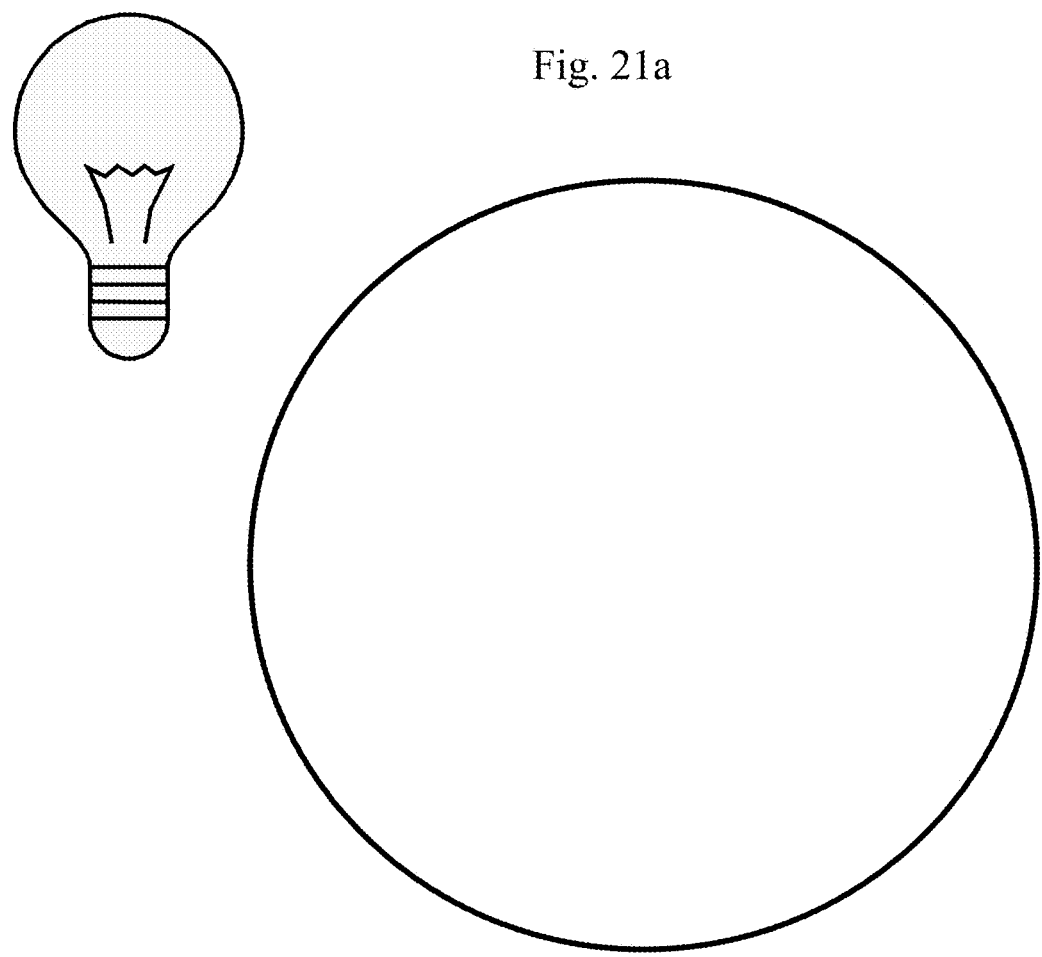
FIGS. 21a-b show a lights source integrated with the snow sphere.

In another variation of the invention (FIG. 21a), there is provided a rollable snow boulder with a lighting source associated therewith. In a further aspect, thereof, the rollable snow boulder includes a snow adhering surface. In addition to or in the alternative, the rollable snow boulder includes a snow capturing surface. In addition to or in the alternative, the rollable snow boulder is rollable about all x, y, z axes, and may be rollable about all 360 degrees.

In operation, the snow boulder with lighting source associated therewith is covered partially or completely therewith in snow and the lighting source is illuminated. In dim or dark lighting, the lighting illuminates the snow boulder. In addition or the alternative, the lighting may be various colors or a combination of colors.

Figure 21B:
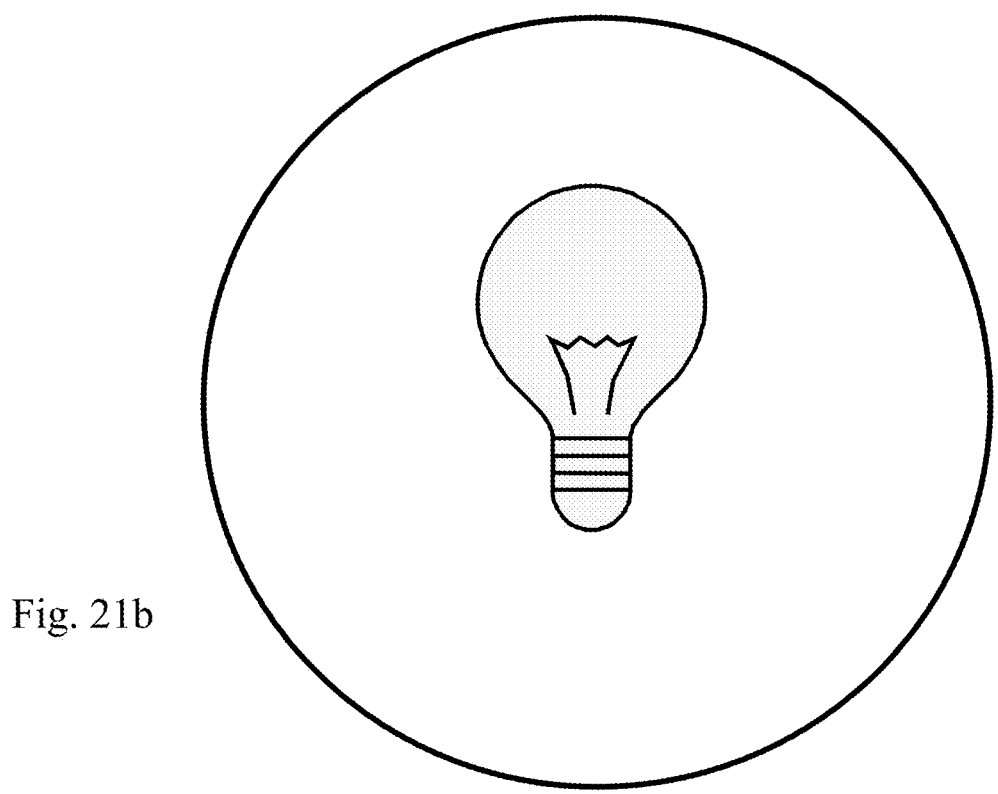

It has been suggested providing a lighting inside within the snow boulder (FIG. 21b). In this manner, the snow boulder would have to be translucent. FIG. 21b shows a white light bulb (100 W) inside a snow boulder.

Figure 21C:
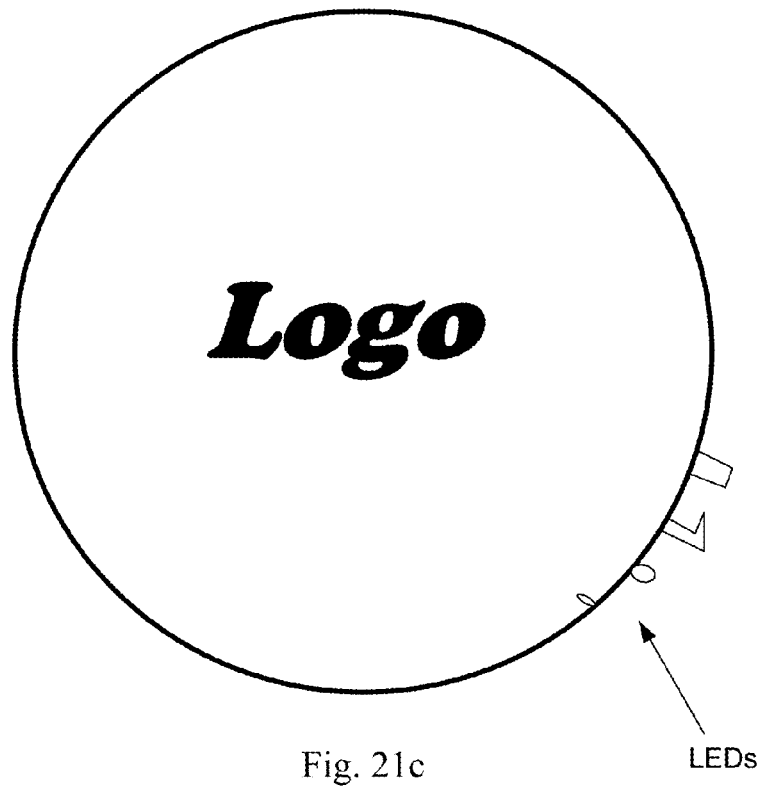
FIGS. 21c-d show the light source integrated in or on the surface of the snow sphere.

The inventor had thought of and created the invention of providing a light source with the sphere. In particular, the inventor designed his new invention using light emitting diodes LEDs or similar semiconductor light emitting devices (bio LEDs, for example) on the surface of the snow boulder. The LEDs could be of different or the same color as shown in FIG. 21c. These may be protruding from the surface or integrated in the surface or both integrated in the surface and extending from the surface. Providing light units on the surface of the sphere is a different invention that allows the light from the LED to penetrate and shine through the snow that covers the snow sphere after rolling or padding snow on the surface. The LEDs could be inserted through holes in the surface of the snow sphere and connected internally to each other inside the sphere. The inventor had thought of this through his experimentation and understanding of snow and his inventions. The invention uses a light source with a snow sphere and further uses a light source on the surface of the snow sphere and further integrating LEDs on the surface of the snow sphere.

In addition, the LEDs in addition or the alternative thereto could form unique designs, such as tradenames or logos of companies for advertisement. In one aspect the snow boulder is created by rolling in snow and the associated lighting is switched on. The tradename or logo would light up and be seen through the snow.

Figure 21D:
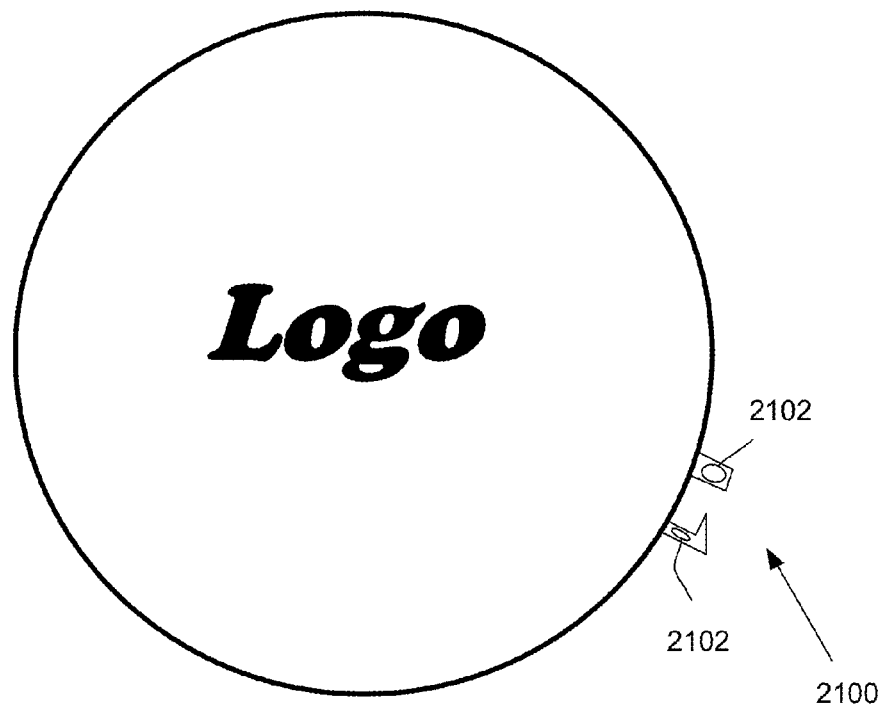

The light units may be employed adjacent to one or more of the textures of the snow adhering surface. In addition or in the alternative, the rollable snow boulder further includes the LEDs or other light source 2100 as an integral part of the snow adhering or capturing surface. For example, in FIG. 21d there is shown the LED or light filament 2102 inside the snow hooks. In one aspect, the LEDs may be the nodules forming the snow adhering surface. In another, they may form in part or in the whole the snow hooks, snow plungers or snow guides. The guides, for example, may be on the surface of the snow hook or between snow hooks. In that regard, the LEDs or individual lighting units, that is lights that affect a small amount of light independent of the other lighting units, do not take up further real estate on the surface of the rollable snow boulder.

Being defracted somewhat, the logo or tradename would include a cool snow halo effect. In that regard, there is also a snow boulder which provides a snow halo effect for a tradename or logo.

In addition or in the alternative, the rollable snow boulder further includes lighting wires connecting the LEDs. In a further aspect thereof, the lighting wires are controlled by a controller to turn the lights on and off or engage different lights in order to affect a moving image with the lights. In which different designs could be displayed and animated. This may include blinking, moving shapes, or even images, in order to effect an eye-catching advertisement.

The lighting wires or connections may be terminated in a power plug that extends through an opening in the snow sphere. In another aspect, the light units are powered through a transformer that receives energy from electromagnetic waves without a physical connection. Further, there may be a battery incorporated within the ball to connect to and power the lighting units.

In addition or in the alternative, the rollable snow boulder further includes an addressable matrix of wires in order to control the lights.

In addition or in the alternative, the snow boulder may include or have associated therewith a controlling unit or remote control device for receiving remote control signals to turn on and off the one or more lights. In another aspect, there may be provided a remote control hand operated unit to generate the signals. Further the control mechanism includes programming to orchestrate the lighting and may be as part of a remote unit. In that regard, different programs can be installed to effect different lighting sequences.

The lighting sequences may also be coordinated to music. There is provided, in addition or in the alternative, a sound source associated with the snow boulder, which may be inside or on the surface of the snow boulder. Therefore, there may be perforation or openings in the snow boulder to allow the sound to be emitted from an internal sound source. Thus, there may be a music source or radio or player integrated inside the snow boulder.

In addition or in the alternative, there may be provided synchronization of the light and sound. In that aspect, the controller controls the light in coordination with the sound or music associated or emanating from within the snow boulder.

Furthermore, the strength or light output or candle watt output of the light units is selected to transmit sufficient light through a layer of snow formed on the snow sphere.

Snow Rock and Rolling Technique.

I have discovered through further testing with snow boulders that very wet snow clumps together and forms heavy layers of snow on the surface of the snow boulder. In some instances the snow falls off due to the weight of the clumping snow on the surface with respect to the adhering and capturing aspects of the snow boulder. As the snow boulder is rolled the wet snow clings to the snow boulder for some time, but may fall off prematurely when it rises above the ground.

I theorize from my experiments that the snow falls off because of lack of supporting snow from other directions. In other words, more adhesion capability is required for this type of snow. One way in which further adhesion can be established to prevent snow from falling off is by providing snow along the sides of the adhering area. This lateral snow adhesion would provide an adhesion laterally between adjacent portions of the snow boulder, whereby additional snow adhesion is provided and the snow is much less likely to fall off.

For this purpose, I have experimented with and developed a new method that works quite well to roll the inventive snow boulder. By starting out with the snow boulder in position A (FIG. 22a), the snow boulder is rolled in what could be described as a spiral, or an expanding concentric circle that grows with each rotation. In another aspect, the spiraling technique rolls the snow boulder such that the circle diameter grows by the amount of snow added by the last spiral. Next, in position B (FIG. 22b) the snow boulder is rolled and the circle of rotation becomes wider. This is because; presumably there is not sufficient or uncompressed snow in the path where the snow boulder has already rolled. Of course, it may be the case that the snow boulder may overlap or again roll over this path, or trajectory. Finally in position C, the snow boulder has a sufficient amount of snow forming an arc of the snow boulder (FIG. 22c)

It shall be appreciated that, in comparison with rolling in a straight line as in the traditional snowman building technique, the proposed method of rolling the snow boulder has the advantage that snow is formed along adjacent sides of the previously adhered snow, thereby providing lateral snow adhesion to the already existing snow. Thus, the snow already formed is less likely to fall off due to heavy snow such as in wet or clumping conditions. This shall be better appreciated with respect to FIG. 23a that shows the boulder with snow adhering to the snow boulder formed with the straight line method. As will be seen, this forms a strip of snow that has no lateral snow adhesion (shown by the phantom lines).

Figure 23B:
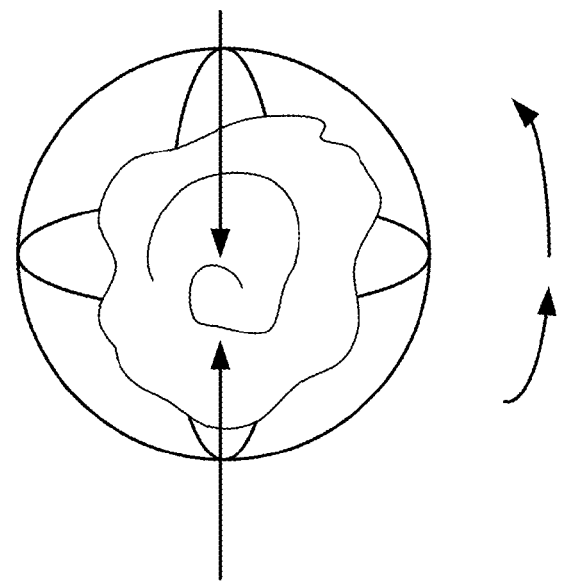
FIGS. 23a-b show how the snow is maintained on the sphere as it is rolled.
Figure 23A:
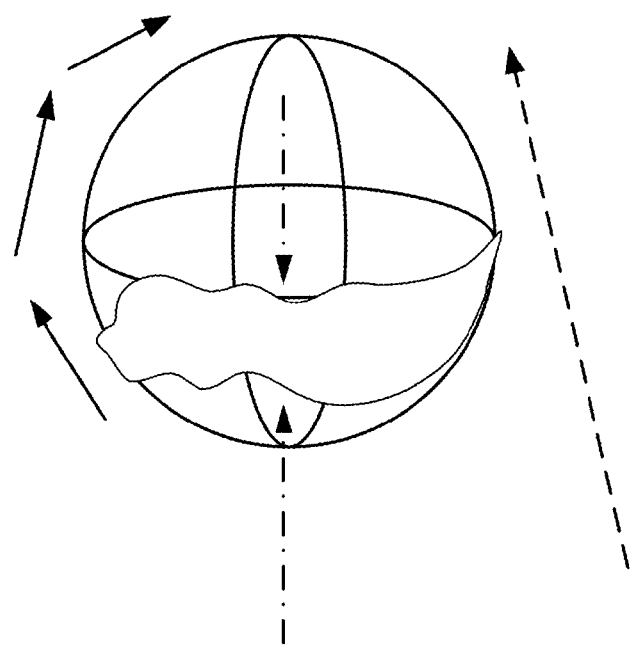

In comparison, FIG. 23b shows the case where the snow boulder is rolled using the spiral technique. Chubby Checker TWIST Technique. In that case, the figure is shown with the bottom side toward the viewer that shows a spherical cap or arc of snow is formed. Here, there is provided a lateral pressure or adhesion from snow provided laterally or adjacently situated to the snow (shown by the solid arrows). In one aspect, this provides 360 degrees of lateral snow adhesion around the snow. The snow provides a bridge by which a mass of snow sticks together as a single unit to the snow boulder and does not fall off. In this manner, the snow boulder can be continued to be rolled until the remainder of the boulder is completely or substantially completely covered in snow.

Actual trials have been conducted with this new method and the method worked quite well with the inventive snow boulders. Adhesion was much improved in the case where the snow clumped and was falling off due to its weight with respect to the adhering capability of the snow boulder. Use of the technique allowed for complete adhesion around the snow boulder with snow as compared with snow falling off with the straight rolling technique.

It shall be noted that such a method for rolling a snow boulder is not within the realm of making normal snowman. For one thing, there is not enough snow in the immediate area to create a snow person in this fashion. Only with such snow boulders as described herein is there sufficient snow on the ground within the immediate area to provide coverage of the snow boulder.

It will also be appreciated that the new twist technique requires less energy on the user and uses less snow overall. In the straight line technique, for example, a lot of ground is trampled on by the user and wastes snow for further snow people. In light snow conditions or in warm climates, the amount of snow required to build one snow person may be critical to building a large or several snowmen. Plus, the user does not have to walk that far to make a snowman. This would be very helpful, for example, to handicapped children.

Next, rolling a normal snow ball using the straight line technique would not form a round ball. For one thing, the user has no point of reference to roll the snow ball such that the new portions of the snow ball are formed and do not overlap substantially with portions already formed. The user would then tend to roll the ball in the same path over and over, thereby forming a bell shaped snow ball, rather than a ball. In the case of the inventive snow boulder, the user has the color of the snow boulder to guide her or him where the snow has not yet been formed on the boulder. Moreover, the bare portions of the inventive snow boulder are easier to track than portions with snow already adhered due to the unencumbered surface of the bare portion, thereby allowing the user to automatically roll the snow boulder in those portions not yet covered in snow.

It shall be further appreciated that this snow boulder twist rolling method reduces the likelihood of snow falling off since it does not allow the snow to rise too high, ie, the midway point of the sphere. It is theorized that at this point, gravity acts on the snow directly downward and has a greater chance of falling off at this point. It further reduces the amount of movement of the snow boulder over terrain and therefore reduces vibration which is also believed to cause snow to fall off more easily.

In addition, it has been experimented and found that the falling off problem also has to do with the size of the snow boulder. Smaller sizes seem to fair better. It appears that the snow has a chance to completely cover the snow boulder before falling off. It is also believed that the smaller radius allows more snow to cover a relatively wider degree of portions around the snow boulder, thereby providing the lateral snow adhesion more quickly. In any event this technique is provided on the basis of the diameter of the snow boulder.

True Grit.

I have experimented with many textures in order to discover various options that work in different types of snow. A number of concepts provide a combination of features that are suitable for adhering and capturing snow in at least two different snow condition types, for example, dry and wet.

In this next aspect, it has been found that a gritty surface combined with any or a plurality of the textures or nodule shapes provided by this solution captures different types of snow. For example, the gritty surface may be suitable for capturing new snow with powdery but moist snow and the snow hooks may be more suitable to capturing deep snow or wetter snow. Combining the gritty surface together with one or more of the nodules provides a good combination of textures that can be used together conveniently to form combination surfaces. The grit may be of a characteristic small size such as, for example, the size of sand granules.

The combination surface can, for example, be provided by first manufacturing the primary surface, such as the snow hooks shown in any of FIGS. 11-20. The snow hooks thus formed may then be coated by a secondary surface, such as a grit (shown by the small circles shown in FIG. 24a, for example). In one aspect, the grit may be applied by means of spraying a paint or glue with grit. The secondary surface may also be applied with a paint or glue that bubbles, and when dries forms hard granules on the surface of the snow boulder.

The grit solution may also be combined with any of the additional adhering and capturing arrangements or methods herein including the plungers, guides, heating, vacuuming, etc. In fact, any combination of textures or surfaces may be combined.

The invention claimed is:

1. An apparatus for building a snow person, the apparatus comprising:
   a ball forming an inside structure of the snow person, the ball having an inner and outer surface;
   wherein the ball is a unitary work piece that is free and unconnected to other work pieces, wherein the ball is composed of a rigid material that resists an impinging force, including a pressure exerted on the surface of the ball when rolled on the ground against a snow surface;
   an adhesion surface disposed on the outer surface of the ball, the adhesion surface provided with nodules that extend away from the outer surface of the ball to adhere snow while the ball is rolled;
   light units integrated into the ball and having light emitting portions that extend away from the outer surface of the ball;
   wherein a light output of the light units is selected to transmit light through a layer of snow; and
   connections between the light units situated within the ball connecting the light units together.

2. The apparatus of claim 1, wherein the light units are LEDs.

3. The apparatus of claim 1, wherein the light units are selected with different colors.

4. The apparatus of claim 1, further comprising a controller to control the light units to turn on and off in a predetermined sequence.

5. The apparatus of claim 1, wherein the light units are synchronized to music.

6. The apparatus of claim 1, further comprising a transformer that receives electromagnetic energy to power the light units.

7. The apparatus of claim 1, further comprising a battery within the ball to power the light units.

8. The apparatus of claim 1, wherein the light units are integrated into the nodules.

9. The apparatus of claim 1, wherein the adhesion surface includes at least two textures configured to attract snow and maintain the snow on the surface of the ball as the ball is rolled.

10. The apparatus of claim 5, wherein the nodules include a first texture configured to adhere moist snow and a second texture comprised of sand to adhere granular snow.

11. The apparatus of claim 1, wherein the nodules have a top surface that is smaller than a base surface.

12. The apparatus of claim 2, wherein the nodules have an impinging surface that is reverse inclined.

13. The apparatus of claim 1, wherein the nodules have a base surface that is smaller than a top surface.

14. The apparatus of claim 1, wherein the nodules are trapezoidal in shape.

15. The apparatus of claim 1, wherein the ball is sphere shaped such that it is rollable in any direction x, y, z.

16. The apparatus of claim 1, wherein the ball is 2-3 feet in diameter.

17. The apparatus of claim 1, wherein the ball is larger than about a professional basketball which is regulated to be about 9.5-9.85 inches in diameter.

18. The apparatus of claim 1, wherein the ball has a diameter of about 4 feet.

19. The apparatus of claim 1, wherein the ball has an interior filled with a material that is lighter than snow.

20. The apparatus of claim 19, wherein at least a portion of the ball is hollow.

21. The apparatus of claim 1, wherein the ball is substantially comprised of metal.

22. The apparatus of claim 1, wherein the nodules have a width of about 2-5 mm.

23. The apparatus of claim 1, wherein the ball is formed of 2 hemispheres fixedly joined together.

24. The apparatus of claim 1, wherein the ball is substantially filled with air.

25. The apparatus of claim 1, wherein the ball further comprises an inflating valve.

26. The apparatus of claim 1, wherein the lighting units have a portion that is inserted through holes in the ball, wherein the light emitting portions extend away from the outer surface of the ball and the connections between the light units are situated within the ball.

* * * * *